United States Patent
Bayha et al.

(10) Patent No.: US 12,388,768 B2
(45) Date of Patent: Aug. 12, 2025

(54) MULTI-STAGE STATE MODEL FOR THE ADMINISTRATION OF PHYSICAL, LOGICAL, AND HYBRID RESOURCES

(71) Applicant: AT&T Intellectual Property I, L.P., Atlanta, GA (US)

(72) Inventors: Ernest Bayha, Jackson, NJ (US); Aaron Harris, Lenexa, KS (US); Brian Horen, Littleton, CO (US); Nathan Skinner, Chesterfield, MO (US); Enhsing Lin, Holmdel, NJ (US); Theresa Michael, Walnut Creek, CA (US); David Whitney, Cumming, GA (US); Jeff Johnson, Helotes, TX (US); Laurie Mitsanas, Concord, CA (US); Michael O'Connor, Lakeville, MN (US)

(73) Assignee: AT&T Intellectual Property I, L.P., Atlanta, GA (US)

(*) Notice: Subject to any disclaimer, the term of this patent is extended or adjusted under 35 U.S.C. 154(b) by 351 days.

(21) Appl. No.: 18/179,044

(22) Filed: Mar. 6, 2023

(65) Prior Publication Data
US 2024/0163227 A1 May 16, 2024

Related U.S. Application Data

(60) Provisional application No. 63/425,598, filed on Nov. 15, 2022.

(51) Int. Cl.
H04L 47/80 (2022.01)
H04L 47/762 (2022.01)

(52) U.S. Cl.
CPC .......... H04L 47/808 (2013.01); H04L 47/762 (2013.01)

(58) Field of Classification Search
None
See application file for complete search history.

(56) References Cited

U.S. PATENT DOCUMENTS

| | | | | |
|---|---|---|---|---|
| 10,878,067 | B2 * | 12/2020 | Lev | H04L 63/1425 |
| 11,057,278 | B1 * | 7/2021 | Côté | H04L 41/16 |
| 2017/0287044 | A1 * | 10/2017 | Rose | G06Q 30/0631 |
| 2019/0018939 | A1 * | 1/2019 | Lev | G06F 18/25 |

* cited by examiner

*Primary Examiner* — Quang N Nguyen
(74) *Attorney, Agent, or Firm* — Guntin & Gust, PLC; John G. Rauch

(57) ABSTRACT

Aspects of the subject disclosure may include, for example, a database being maintained that has information indicating states of network resources, which can be determined based on physical activities, logical activities and hybrid activities performed on or by the network resources; obtaining activity information for a particular network resource, where the activity information is a physical activity, a logical activity and/or a hybrid activity; and determining whether a state change for the particular network resource should be made such as to whether the activity information corresponds to and warrants change to at least one of an inventory state, an operational state, or a detailed state. Other embodiments are disclosed.

19 Claims, 40 Drawing Sheets

260

270

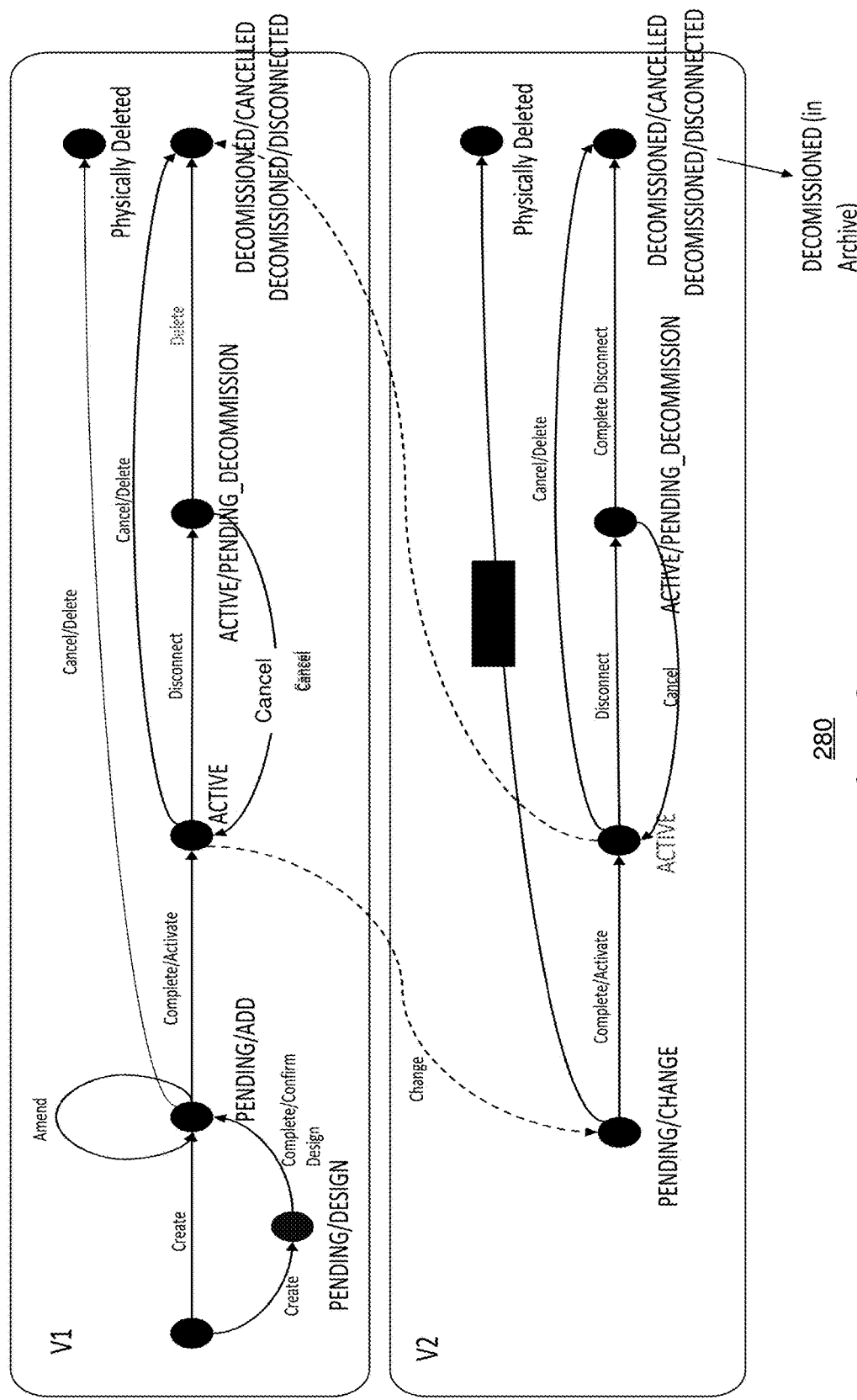

| Inventory Status Values (REQUIRED) DEFAULT VALUE = | Applicable to Resource | | | | | | | | Notes |
|---|---|---|---|---|---|---|---|---|---|
| | Site | Network Inventory | | | | Port | Physical Connection/Connection Endpoint/Logical Connection | | |
| | | Unit (Equipment) | Equipment Holder | Unit (Card) | | | | | |
| ACTIVE | Yes | Yes | Yes | Yes | Yes | Yes | Yes | Yes | Resource is ready for operational deployment. |
| PENDING | Yes | Yes | Yes | Yes | Yes | Yes | Yes | Yes | PLANNED maps to PENDING; reserve something in inventory; should be PENDING as default state |
| DECOMMISSIONED | Yes | Yes | Yes | Yes | Yes | Yes | Yes | Yes | Resource is to be decommissioned. |

| operationalStatus VALUES (REQUIRED) DEFAULT VALUE = NON_OPERATIONAL | Applicable to Resource ||||||| Notes |
|---|---|---|---|---|---|---|---|---|
| | Site | Equipment | Equipment Holder | Card | Port | Physical Connection | Connection Endpoint | Logical Connection | |
| OPERATIONAL | Yes | Yes | Yes | Yes | Yes | Yes | Yes | Yes | A value of "OPERATIONAL" means an entity (e.g., NE) is fully or partially operable after it completes SVT (System Verification Testing) and EVT (Environmental Testing). The ability for which events/alerts are being generated and tickets generated processed for a resource is identified by detailedStatus (e.g., INSVCPRV, INTPPROV, PROV) |
| NON_OPERATIONAL | Yes | Yes | Yes | Yes | Yes | Yes | Yes | Yes | |

| DetailedStatus Values (OPTIONAL) (expect more values to be added as additional) | Site | Equipment | Equipment Holder | Card | Port | Physical Connection | Connection Endpoint | Logical Connection | Notes |
|---|---|---|---|---|---|---|---|---|---|
| DOWNSPEED | No | No | No | No | No | No | No | Yes | Granite-NIS "Active-UPSPD RR-PROF": capacity of part (i.e., endpoint) is fixed so "DOWNSPEED" applies only to Logical Connection |
| UPSPEED | No | No | No | No | No | No | No | Yes | Granite-NIS "Active-UPSPD RR-PROF": capacity of part (i.e., endpoint) is fixed so "UPSPEED" applies only to Logical Connection |
| ASR_SUBMITTED | No | No | No | No | No | No | No | Yes | Access Service Request (ASR) submitted to 3rd party carrier |
| BUILD_IN_PROCESS | Yes | Yes | Yes? | Yes? | Yes | No | No | No | Inventory appears during design process: name the equipment, create an inventory record, Server supporting network cloud? Once Operating System is installed, apps are run to get server into inventory with installed value. Value does not apply to virtual resources... Create design, but equipment has not showed up. |
| CANCELLED | Yes | Yes | Yes | Yes | Yes | Yes | Yes | No | Resource order cancelled; entered in error. |
| CAPPED | Yes | Yes | No | Yes | No | No | No | No | Capped indicates that provisioning additional traffic, or services on a resource is not allowed. Can be a continuous state. |
| COLD_SPARE | No | Yes | No | Yes | No | No | No | No | Resource is physically present, but not powered on; could have cold spare cards (plug card into a warm or hot spare, device would be warm or hot, but the cards plugged into the warm or hot spare device would be considered cold. |
| DISCO_ASR_ISSUED | No | No | No | No | No | No | No | Yes | Access Service Request (ASR): applies to logical connection only |
| DISCO_FOC_RECEIVED | No | No | No | No | No | No | No | Yes | Firm Order Commitment (FOC): applies to logical connection only |
| FAILED_ACTIVATION | No | No | No | No | No | No | No | Yes | Failed activation of the circuit; applies to logical connection only |
| DLR_RECEIVED | No | No | No | No | No | No | No | Yes | ASR received, then FOC, then DLR is performed; applies to logical connection only |
| FOC_RECEIVED | No | No | No | No | No | No | No | Yes | Firm Order Confirmation (FOC) Received from 3rd party carrier in response to ASR_SUBMITTED; applies to logical connection only |

| State | | | | | | | | Description |
|---|---|---|---|---|---|---|---|---|
| FOC_RECEIVED | No | No | No | No | No | No | Yes | Firm Order Confirmation (FOC) Received from 3rd party carrier in response to ASR_SUBMITTED; applies to logical connection only |
| INACTIVE_IN_CSS | Yes | Yes | No | Yes | No | No | No | More specific decommissioned status; needed for migration purposes initially due to clean-up, but eventually these values would get archived as CSS/EVO would use SN database; value could be considered for removal later after CSS/EVO migration; there is no visibility on Resource (physical equipment) is physically installed |
| INSTALLED | No | Yes | Yes | Yes | Yes | No | No | |
| NVTPROV | No | No | No | Yes | No | Possible | No | The equipment can report alarms to collectors that are processed to collect the alarms from the equipment; ticketing of alarms, but no generation of tickets yet. Events are allowed to flow into a system and be reported as alarms (from a network perspective); for ports and endpoints, use case dependent |
| PENDING_DECOMMISSIO | Yes | Yes | Yes | Yes | Yes | Yes | Yes | Pending decommission |
| PREPROV | No | No | No | Yes | No | Possible | No | Any piece of equipment from order to build (tracked and added), but has no where to report this problem (needs to be provisioned). Alerts can be sent, but there is no product of the alarm; for ports and endpoints, use case dependent |
| PROV | No | No | No | Yes | No | Possible | No | ticketing can be done at this point; transitions from NVTPROV to PROV; live support is this point; for ports and endpoints, use case dependent |
| RETIRED_IN_PLACE | No | Yes | Yes | Yes | Yes | No | No | Resource is retired (was PROV) but stays in place, must be inventoried; fully depreciated in finance systems; costs more to remove the equipment because it is useless; lease record in place |
| ARCHIVED | No | Yes | Yes | Yes | Yes | Yes | Yes | Resource has been fully removed from the active inventory database. DECOMMISSIONED/NON_OPERATIONAL. Once it is fully removed, the record will be gone. |
| TESTING | No | No | No | No | No | Yes | Yes | Circuit undergoing validation testing (Bit Error Rate (BER), burn-in |

| detailed Status Values (OPTIONAL) (Expect these Values to Be Added as Additional DDDRs are Evaluated) | Applicable to Resource | | | | | | | Notes |
|---|---|---|---|---|---|---|---|---|
| | Site | Equipment | Equipment Holder | Card | Port | Physical Connection | Connection Endpoint/Logical Connection | |
| NOT_SPARE | no | yes | no | no | no | no | yes | Granular BW: "Active UPSPD IN-PROG" maps to "DOWNSPEED"; capacity of port (i.e., endpoint) is fixed as "DOWNSPEED" (applies only to Logical Equipment (chassis) capable of running traffic (must be cabled) but it is a spare (based to provide an improved definition) |
| DEFECTIVE | no | yes | no | no | yes | no | no | Represents a failed part on a piece of equipment; one that does not work (use "DEFECTIVE" instead of failed, works for both: NIC and c3, does not apply to shelf (if it did, the shelf would be replaced)) |
| FAILED | no | no | no | no | yes | no | no | Failure is port, but not on entire card. |
| RESERVED | no | yes | no | yes | yes | yes | yes | RESERVED if there is a project build in place. Object classifies across as long as its not-in-process works to mask for a connection (to be put in place) |
| SUSPECT | no | no | no | no | yes | no | no | Suspect to be defective, but not proven as such: DEFECTIVE vs AIS, no suspect vs AIS vs SUSPECT equivalent. DEFECTIVE: Represents a failed port on a piece of equipment; one that does not work (use "DEFECTIVE" instead of failed, works for both AIS and c3, does not apply to shelf (if it did, the shelf would be replaced)) |
| UNEQUIPPED | no | no | no | no | yes | no | no | Maps to "Reserved" |
| NOT_WIRED | no | no | no | no | yes | no | no | Port physically present, not expected to be wired |
| WIRED_UNEQUIPPED | no | no | yes | no | yes | yes | no | Supposed to be wired, but the port is not present (waiting to serve the port into) |
| ORDERED | no | no | no | no | yes | yes | no | Equipment and port ordering status; different from ORDER_RECEIVED which is a patch status; few instances |
| DESIGN | no | no | no | no | no | no | yes | Design is a subset of pending |

| | | | | | | | | |
|---|---|---|---|---|---|---|---|---|
| ADD | No | No | No | No | No | No | No | Yes | Creation request of a new "create" logical connection request (versionNum = 3). Once complete, the inventoryStatus changes from "PENDING" to "ACTIVE". design is complete, can start the circuit provisioning. Provides extra status information (ASI) on a pending order. |
| CHANGE | No | No | No | No | No | No | No | Yes | Change requested on an active logical connection. Change will result in a new version of the logical connection (e.g., versionNum = 2). Once completed, the inventoryStatus for the change request (i.e., pending change ?) becomes "ACTIVE". Provides extra... |
| Under (invest) | | | | | | | | | |
| LOCKED | ?? | ?? | ?? | ?? | No | No | No | No | Needed? |
| UNLOCKED | ?? | ?? | ?? | ?? | No | No | No | No | Needed? Temporary condition on an interface or port; once issue is resolved, turn resource back on to unlocked state? No. Would not update R/M/DB value to SHUTTING_DOWN (Russell and Kerison: unnecessary administrative overhead to set these values [SHUTTING_DOWN, LOCKED, UNLOCKED. Carless: not used on mobility REs, may be more focused on routers |
| SHUTTING_DOWN | ?? | ?? | ?? | ?? | No | No | No | No | No maintenance flag at CI level; CI assigned Change request, when is gets to implement stage, the CIs associated are put into a maintenance usage table. Any CI in maintenance table, don't create a ticket. Once change request is out of implement phase and onto next phase, the CIs are taken out of the implement table. |
| WARM_SPARE | No | Yes | Yes? | Yes? | No | No | No | No | Network blade, warm spare, not capable of running traffic, configuration applied, plugged in, ... some level of cabling can be done; is alternative attribute of an equipment rather than stand? can use standby state instead of sparse to maintain the "temperature" of the... |
| RETIRED | No | No | Yes? | Yes? | Yes? | Yes? | Yes? | No | Not used by Ericsson-LS and 4RS |

SITE

| A single state database Status Values (See Separate Tab) | inventoryStatus (REQUIRED) | operationalStatus (REQUIRED) | detailedStatus* (OPTIONAL) | Notes |
|---|---|---|---|---|
| Pending | PENDING | NON_OPERATIONAL | N/A | N/A (i.e., N/A means the value is NULL (not present)) |
| Planned | PENDING | NON_OPERATIONAL | N/A | N/A |
| Active | ACTIVE | OPERATIONAL | N/A | N/A |
| Active-Reserved | N/A | N/A | N/A | N/A |
| Pending Decommission | ACTIVE | OPERATIONAL | PENDING_DECOMMISSION | in the process of actively decommissioning the site; there is still live traffic at this site |
| Decommissioned | DECOMMISSIONED | NON_OPERATIONAL | N/A | Decommissioning of a site; records are still in the system pointing to CIs; could include selling of a site? |
| Cancelled | DECOMMISSIONED | NON_OPERATIONAL | CANCELLED | Going to build a site and changed mind: Site record loaded by mistake; archived, but removed from the active database; differs from decommissioned |
| Inactive in CSS | DECOMMISSIONED | NON_OPERATIONAL | INACTIVE_IN_CSS | More specific decommissioned status, source system has removed this site; needed for migration purposes initially due to clean-up, but eventually these values would get archived as CSS/LEVO would use SN database; value could be considered for removal later after CSS/LEVO migration |

SITE

| A single state database Status Values (See Separate Tab) | | | |
|---|---|---|---|
| Live | ACTIVE | OPERATIONAL | N/A | active |
| Active | ACTIVE | OPERATIONAL | N/A | active |
| Pending | PENDING | NON_OPERATIONAL | N/A | Pending and Reserved are the same from a -15 perspective |
| Reserved | PENDING | NON_OPERATIONAL | N/A | Pending and Reserved are the same from a -15 perspective |
| ~~Delete~~ | | | | ~~One site in -15 non-existent status after site was deleted~~ |
| Capped | ACTIVE | OPERATIONAL | CAPPED | Ex: all of the available rack space used or no more power available; or AT&T decided it does not want to use the site anymore even though there is space or power available; where do we draw the line between; PENDING_DECOMMISSION versus CAPPED? |
| BUILD_IN_PROCESS | PENDING | NON_OPERATIONAL | BUILD_IN_PROCESS | Building of a site; site is being built; BUILD_IN_PROCESS indicates that the installation process has started but not completed. |
| Reserved | PENDING | NON_OPERATIONAL | RESERVED | Portion of a site is blocked off for possible future use |
| Archived | DECOMMISSIONED | NON_OPERATIONAL | ARCHIVED | Involves decommissioning of a site and archiving the site records for a period of time |
| Retired | DECOMMISSIONED | NON_OPERATIONAL | RETIRED | |

Fig. 2K-1 296

EQUIPMENT

| A single state database Status Values | inventoryStatus (REQUIRED) | operationalStatus (REQUIRED) | detailedStatus* (OPTIONAL) | Description/Notes |
|---|---|---|---|---|
| Planned | PENDING | NON_OPERATIONAL | N/A | Planned is a status in-NIS |
| Pending | PENDING | NON_OPERATIONAL | N/A | Pending is a status in-LS and -NIS |
| Ordered | PENDING | NON_OPERATIONAL | ORDERED | Equipment status: ORDERED is different from ORDER_RECEIVED which is a path status; few instances |
| Installed | PENDING | NON_OPERATIONAL | INSTALLED | Resource is physically installed |
| Active | ACTIVE | OPERATIONAL | N/A | ACTIVE applies to -NIS |
| In-Effect | ACTIVE | OPERATIONAL | N/A | IN-EFFECT for -LS |
| Active-Idle | N/A | N/A | N/A | Mostly used on vm shelfs; for equipment do not need this status value for -NIS; not used in -LS |
| Active-Out-of-Service | N/A | N/A | N/A | Not commonly used in -NIS; for equipment do not need this status value for -NIS; not used in -LS |
| Active-Reserved | N/A | N/A | N/A | At shelf level; no blocking results; usage incorrect/abused in Granite; do not need |
| Pending_Decommission | ACTIVE | OPERATIONAL | PENDING_DECOMMISSIONED | Equipment is pending decommission |
| Decommissioned | DECOMMISSIONED | NON_OPERATIONAL | RETIRED_IN_PLACE | For Granite-LS mapping from Decommissioned to Retired_IN_Place" (different approach than mobility); equipment is retired (like 76O9), but stays in place, must be inventoried, fully depreciated in finance systems; "costs more to remove the equipment because it is useless; Leave record in place. |
| Decommissioned | DECOMMISSIONED | NON_OPERATIONAL | | Decommissioned STATUS changes before the equipment gets archived. Delete = archive is a second action/operation where the object is removed from the active database and moved to archived database and retains its archived status. Archive is not a status value in Granite-NIS. Aaron suggests "to retain the integrity of the database entry in the CMDB to maintain the integrity of the database entry in equipment either remains decommissioned in placed or archived." Brian says we need to understand how SN will deal with archive records; he does not want an |

Fig. 2K-2  296

| | | | |
|---|---|---|---|
| Decommissioned | DECOMMISSIONED | NON_OPERATIONAL | ARCHIVED-???? | Resource has been fully removed from the active inventory database. DECOMMISSIONED/NON_OPERATIONAL: Once it is fully removed, the record will be gone. AT&T should have an archived database, but do not want a detailed status of ARCHIVED. Brian is concerned about having a VERY LARGE database consisting of both active and archived records. Slows the search the capability down. |
| Decommissioned | DECOMMISSIONED | NON_OPERATIONAL | CANCELLED | Loaded by mistake; archived, but removed from the active database; differs from decommissioned |
| Decommissioned | DECOMMISSIONED | NON_OPERATIONAL | INACTIVE_IN_CSS | More specific decommissioned status, source system has removed this device, needed for migration purposes initially due to clean-up, but eventually these values would get archived as CSS/LEVO would use SR database; value could be considered for removal later after CSS/LEVO migration |
| Decommissioned Retired in Place | DECOMMISSIONED | NON_OPERATIONAL | RETIRED_IN_PLACE | Granite-NIS "Retired in Place" status maps to DECOMMISSIONED/NON_OPERATIONAL/RETIRED_IN_PLACE |
| Decommissioned | ACTIVE | OPERATIONAL | RESERVED | future). Object itself is active as long as it is set-up (even while it waits for a connection to be put in place) In LS, it blocks ports from being used, in _NIS this port SHOULD not be used. If you have five work orders, business logic will allow ports to be used (the it to a pending work order; things will be reserved for months on end (e.g., for LS, after ~2 months the resource is unreserved); also don't want a situation where circuit has been run and equipment has not been installed yet. Can have RESERVED IF there is a project build in place. Object itself is active as long as its set-up (even while it waits |

Fig. 2K-3  296

| Other DBOR Status Values | | | |
|---|---|---|---|
| NVT_PROV | ACTIVE | OPERATIONAL | NVT_PROV | Racked and cabled and configured; going through final test; changes from PENDING/NON_OPERATIONAL to ACTIVE/OPERATIONAL when transitioning from PREPROV to NVT_PROV |
| PROV | ACTIVE | OPERATIONAL | PROV | Everything is ready, but not determinative of customer presence |
| PREPROV | PENDING | NON_OPERATIONAL | PREPROV | A resource is in PREPROV status until it changes to NVTPROV; in PREPROV status while equipment is ordered and inventoried, it is given a name before it may have been shipped |
| COLD_SPARE | ACTIVE | NON_OPERATIONAL | COLD_SPARE | Equipment is physically present, but not powered on |
| HOT_SPARE | ACTIVE | NON_OPERATIONAL | HOT_SPARE | HOT SPARE status not used in F&B/Mobility or VOIP (want it to be hot/available for use and monitored); Up and running boxes; maintain the health of these boxes; Box 101 (primary) and box 102 sitting side-by-side to 101 - if 101 goes down, traffic switched to 102. Then, put traffic back on 101 when repaired; distinguish between high availability and spare; P1/P2 needs both provStatus and determination of WARM_SPARE, for example; boolean value isSpare attribute used in SDNa rather than a "detailedStatus" "Ready for use"; |

| | | | |
|---|---|---|---|
| WARM_SPARE | ACTIVE | OPERATIONAL | WARM_SPARE | Same as HOT_STANDBY, capable of running traffic, but it is a spare. WARM_SPARE status not used in FBB / mobility or VOIP. WARM_SPARE used in network cloud designs ... Just powered on ... Equipment present, operational (racked with power) |
| CAPPED | ACTIVE | OPERATIONAL | CAPPED | Capped indicates that provisioning additional traffic or services on a resource is not allowed. Can be a continuous state. |

EQUIPMENT HOLDER

| A single state database Status Values (Relative to Equipment Holders) | inventoryStatus (REQUIRED) | operationalStatus (REQUIRED) | detailedStatus* (OPTIONAL) | Notes |
|---|---|---|---|---|
| Planned | PENDING | NON_OPERATIONAL | N/A | Planned is a status in -NIS |
| Pending | PENDING | NON_OPERATIONAL | N/A | Pending is a status in -LS and -NIS |
| Ordered | PENDING | NON_OPERATIONAL | ORDERED | Equipment status; different from ORDER_RECEIVED which is a path status; few instances |
| Installed | PENDING | NON_OPERATIONAL | INSTALLED | Resource is physically installed |
| Active | ACTIVE | OPERATIONAL | N/A | ACTIVE applies to -NIS |
| In-Effect | ACTIVE | OPERATIONAL | N/A | IN-EFFECT for -LS |
| Active-~~Idle~~ | N/A | N/A | N/A | Mostly used on vm shelfs, for equipment holders, do not need this status value for -NIS, not used in -LS |
| Active-~~OutofService~~ | N/A | N/A | N/A | Not commonly used in -NIS; for equipment holders, do not need this status value for -NIS; not used in -LS |
| Active-~~Reserved~~ | N/A | N/A | N/A | At shelf level; no blocking results; usage incorrect/abused in Granite; do not need |
| Pending_Decommission | ACTIVE | OPERATIONAL | PENDING_DECOMMISSIONED | Equipment is active, but pending decommission |
| Decommissioned | DECOMMISSIONED | NON_OPERATIONAL | RETIRED_IN_PLACE | equipment is retired (like 7609) but stays in place, must be inventoried; fully depreciated in finance systems; "costs more to remove the equipment because it is useless; Leave record in place |

| | | | |
|---|---|---|---|
| Decommissioned | DECOMMISSIONED | NON_OPERATIONAL | ARCHIVED | Resource has been fully removed from the active inventory database. DECOMMISSIONED/NON_OPERATIONAL: Once it is fully removed, the record will be gone. |
| Cancelled | DECOMMISSIONED | NON_OPERATIONAL | CANCELLED | Equipment holder loaded by mistake; archived, but removed from the active database; differs from decommissioned |
| Inactive in CSS | DECOMMISSIONED | NON_OPERATIONAL | INACTIVE_IN_CSS | More specific decommissioned status, source system has removed this device; needed for migration purposes initially due to clean-up, but eventually these values would get archived as CSS/LEVO would use SN database; value could be considered for removal later after CSS/LEVO migration |
| Retired in Place | DECOMMISSIONED | NON_OPERATIONAL | RETIRED_IN_PLACE | Granite Retired in Place status maps to DECOMMISSIONED/OPERATIONAL /RETIRED_IN_PLACE |
| Reserved | ACTIVE | OPERATIONAL | RESERVED | RESERVED If there is a project build in place. Object itself is active as long as it is set-up (even while it waits for a connection to |

| Other DBOR Status Values | | | | |
|---|---|---|---|---|
| WARM_SPARE | ACTIVE | | OPERATIONAL | WARM_SPARE | Equipment is present, operational (racked with power); Same as HOT_STANDBY; capable of running traffic, but it is a spare |
| CAPPED | ACTIVE | | OPERATIONAL | CAPPED | Capped indicates that provisioning additional traffic or services on a resource is not allowed. Can be a continuous state. |

CARD

| A single state database example Status Values (See Separate Tab) | inventoryStatus (REQUIRED) | operationalStatus (REQUIRED) | detailedStatus* (OPTIONAL) | Description/Notes |
|---|---|---|---|---|
| Planned | PENDING | NON_OPERATIONAL | N/A | |
| Pending | PENDING | NON_OPERATIONAL | N/A | Equipment status; different from ORDER_RECEIVED which is a path status; few instances |
| Ordered | PENDING | NON_OPERATIONAL | ORDERED | |
| Installed | PENDING | NON_OPERATIONAL | INSTALLED | Resource is physically installed |
| Active | ACTIVE | OPERATIONAL | N/A | |
| In-Effect | ACTIVE | OPERATIONAL | N/A | |
| Active-Idle | N/A | N/A | N/A | N/A. Mostly used on vm shelfs |
| Active-OutofService | N/A | N/A | N/A | Status not used in A&A; in -LS, reserved only at port status; at shelf level; no blocking results; usage incorrect/abused in Granite; do not need; RESERVED if there is a project built in place. Object itself is active as long as it is configured (answered, cabled) and ready for use (including testing) |
| Active-Reserved | ACTIVE | OPERATIONAL | RESERVED | |
| Pending_Decommission | ACTIVE | OPERATIONAL | PENDING_DECOMMISSIONED | Equipment is pending decommission |
| Decommissioned | DECOMMISSIONED | NON_OPERATIONAL | RETIRED_IN_PLACE | For Granite-LS; mapping from Decommissioned to Retired_in_Place" (different approach than mobility); equipment is retired (like 7809), but stays in place, must be |
| Decommissioned | DECOMMISSIONED | NON_OPERATIONAL | ARCHIVED | Resource has been fully removed from the active inventory database. DECOMMISSIONED/NON_OPERATIONAL: Once it is fully removed, the record will be gone. |
| Cancelled | DECOMMISSIONED | NON_OPERATIONAL | CANCELLED | Resource (card) has been loaded by mistake; archived, but removed from the active database; differs from |
| Retired in Place | DECOMMISSIONED | NON_OPERATIONAL | RETIRED_IN_PLACE | Granite-NS "Retired in Place" status maps to DECOMMISSIONED/NON_OPERATIONAL/RETIRED_IN_PLACE |

| Other DBOR Status Values | | | |
|---|---|---|---|
| NVT_PROV | ACTIVE | OPERATIONAL | NVT_PROV |
| PROV | ACTIVE | OPERATIONAL | PROV | Racked and cabled and configured; going through final test; changes from PENDING/NON_OPERATIONAL to ACTIVE/OPERATIONAL when transitioning from PREPROV to ready, but not determinative of customer presence |
| PREPROV | PENDING | NON_OPERATIONAL | PREPROV | A resource is in PREPROV status until it changes to NVTPROV; in PREPROV status while equipment is ordered and inventoried, it is given a name before it may have been shipped |
| COLD_SPARE | ACTIVE | NON_OPERATIONAL | COLD_SPARE | Is physically present, available to be used, but not powered on |
| HOT_SPARE | ACTIVE | OPERATIONAL | HOT_SPARE | Is physically present, operational, and powered on |
| WARM_SPARE | ACTIVE | OPERATIONAL | WARM_SPARE | Same as HOT_STANDBY; capable of running traffic, but it is a spare |
| CAPPED | ACTIVE | OPERATIONAL | CAPPED | Capped indicates that provisioning additional traffic or services on a resource is not allowed. Can be a continuous state. |

*Note: descriptions for NVT_PROV row are combined into the PROV row as shown in source.*

PORT

| A single state data base Status Values (See Separate Tab) | inventoryStatus (REQUIRED) | operationalStatus (REQUIRED) | detailedStatus^ (OPTIONAL) | Description/Notes |
|---|---|---|---|---|
| Ok | ACTIVE | OPERATIONAL | N/A | Functional port (~99% are in this status); map to invStatus = ACTIVE, not operationalStatus = OPERATIONAL |
| Active | ACTIVE | OPERATIONAL | N/A | |
| In-Effect | ACTIVE | OPERATIONAL | N/A | |
| Planned | PENDING | NON_OPERATIONAL | N/A | |
| Pending | PENDING | NON_OPERATIONAL | N/A | |
| Failed | ACTIVE | NON_OPERATIONAL | DEFECTIVE | Represents a failed port on a piece of equipment; one that does not work (use "DEFECTIVE" instead of failed, works for both -NS and -LS; does not apply to shelf (if it did, the shelf would be replaced) |
| Reserved | ACTIVE | OPERATIONAL | RESERVED | Itself is active as long as it is set-up (even while it waits for a connection to be put in place). LS it blocks port from being used. In -NS this port SHOULD not be used. If you have free work orders, business logic will allow ports to be used (tie it to a pending work order; things will be reserved for months on end; also don't want a situation where circuits has been run and equipment has not been installed yet. Can have Suspected to be defective, but not proven so; map to DEFECTIVE in -NS, no suspect in -LS, -LS would map to DEFECTIVE; Represents a failed port on a piece of |
| Suspect | ACTIVE | OPERATIONAL | DEFECTIVE | equipment; one that does not work (use "DEFECTIVE" instead of failed, works for both -NS and -LS; does not apply to shelf (if it did, the shelf would be replaced) |
| Unequipped | ACTIVE | OPERATIONAL | RESERVED | Status existed prior to "Not_Wired" and "Wire/Not_equipped" (SAME AS RESERVED); not in -LS |
| Not_Wired | ACTIVE | OPERATIONAL | NOT_WIRED | Port physically present, not expected to be wired Not in -LS; however, in -NS this status is still used; expected port to be wired, but the port is not present |
| Wire/Not_equipped | ACTIVE | NON_OPERATIONAL | WIRED_UNEQUIPPED | (nothing to wire the port into); not in -LS |

| | | | | |
|---|---|---|---|---|
| Ordered | PENDING | NON_OPERATIONAL | ORDERED | port "ordered" status; different from ORDER_RECEIVED which is a path status; few |
| Installed | PENDING | NON_OPERATIONAL | INSTALLED | Resource (port?) is physically installed |
| Pending Decommission | ACTIVE | OPERATIONAL | PENDING_DECOMMISSIONED | Equipment (port?) is pending decommission |
| Decommissioned | DECOMMISSIONED | NON_OPERATIONAL | RETIRED_IN_PLACE | Equipment (port?) is retired (like 7609), but stays in place, must be inventoried; fully depreciated in finance systems; "costs more to remove the equipment because it is useless; Leave record in place |
| Decommissioned | DECOMMISSIONED | NON_OPERATIONAL | ARCHIVED | Resource (port?) has been fully removed from the active inventory database. DECOMMISSIONED/NON_OPERATIONAL: Once it is fully removed, the record will be gone. |
| Cancelled | DECOMMISSIONED | NON_OPERATIONAL | CANCELLED | Port? is loaded by mistake; archived, but removed from the active database; differs from decommissioned |
| Inactive in CSS | DECOMMISSIONED | NON_OPERATIONAL | INACTIVE_IN_CSS | More specific decommissioned status, source system has removed this device; needed for migration purposes initially due to clean-up, but eventually these values would get archived as CSS/LEVO would use SN database; value could be considered for removal later after CSS/LEVO migration |
| Retired in Place | DECOMMISSIONED | NON_OPERATIONAL | RETIRED_IN_PLACE | GraniteRetired in Place status maps to DECOMMISSIONED/OPERATIONAL/RETIRED_IN_PLACE |

Fig. 2N-3   296

| | | | | |
|---|---|---|---|---|
| Ordered | PENDING | NON_OPERATIONAL | ORDERED | port "ordered" status; different from ORDER_RECEIVED which is a path status; few |
| Installed | PENDING | NON_OPERATIONAL | INSTALLED | Resource (port?) is physically installed |
| Pending Decommission | ACTIVE | OPERATIONAL | PENDING_DECOMMISSIONED | Equipment (port?) is pending decommission equipment (port?) is retired (like 7609), but stays in place, must be inventoried; fully depreciated in finance systems; "costs more to remove the equipment because it is useless; leave record in place |
| Decommissioned | DECOMMISSIONED | NON_OPERATIONAL | RETIRED_IN_PLACE | Resource (port?) has been fully removed from the active inventory database. DECOMMISSIONED/NON_OPERATIONAL: Once it is fully removed, the record will be gone. |
| Decommissioned | DECOMMISSIONED | NON_OPERATIONAL | ARCHIVED | Port? is loaded by mistake; archived, but removed from the active database; differs from decommissioned |
| Cancelled | DECOMMISSIONED | NON_OPERATIONAL | CANCELLED | More specific decommissioned status, source system has removed this device; needed for migration purposes initially due to clean-up, but eventually these values would get archived as CSS/LEVO would use SN database; value could be considered for removal later after CSS/LEVO migration |
| Inactive in CSS | DECOMMISSIONED | NON_OPERATIONAL | INACTIVE_IN_CSS | |
| Retired in Place | DECOMMISSIONED | NON_OPERATIONAL | RETIRED_IN_PLACE | GraniteRetired in Place  status maps to DECOMMISSIONED/OPERATIONAL/RETIRED_IN_PLACE |

Fig. 2N-4    296

| Other DBOR Status Values | | | |
|---|---|---|---|
| NVT_PROV | ACTIVE | OPERATIONAL | NVT_PROV | Racked and cabled and configured; going through final test; changes from PENDING/NON_OPERATIONAL to ACTIVE/OPERATIONAL when transitioning from PREPROV to NVT_PROV |
| PROV | ACTIVE | OPERATIONAL | PROV | ready, but not determinative of customer presence |
| PREPROV | PENDING | NON_OPERATIONAL | PREPROV | A resource is in PREPROV status until it changes to NVTPROV; in PREPROV status while equipment is ordered and inventoried, it is given a name before it may have been shipped |
| CAPPED | ACTIVE | OPERATIONAL | CAPPED | Capped indicates that provisioning additional traffic or services on a resource is not allowed. Can be a continuous state. |
| RESERVED | ACTIVE | OPERATIONAL | RESERVED | LS it blocks port from being used, in _NIS this port SHOULD not be used. If you have live work orders, business logic will allow ports to be used (tie it to a pending work order; things will be reserved for months on end; also don't want a situation where circuit has been run and equipment has not been installed yet. Can have RESERVED if there is a project build in place. Object itself is active as long as it is set-up (even while it waits for a connection to be put in place) |

PHYSICAL CONNECTION

| A single state database Status Values See Separate Tab | inventoryStatus (REQUIRED) | operationalStatus (REQUIRED) | detailedStatus* (OPTIONAL) | Description/Notes |
|---|---|---|---|---|
| Pending | PENDING | NON_OPERATIONAL | N/A | |
| Planned | PENDING | NON_OPERATIONAL | N/A | |
| Active | ACTIVE | OPERATIONAL | N/A | |
| Decommissioned | DECOMMISSIONED | NON_OPERATIONAL | RETIRED_IN_PLACE RETIRED ARCHIVED | RETIRED_IN_PLACE: equipment is retired, but stays in place, must be inventoried; fully depreciated in finance systems; "costs more to remove the equipment because it is useless<br>RETIRED (Under investigation): On its way being archived or removed<br>ARCHIVED: Documented for a period of time |
| | DECOMMISSIONED | NON_OPERATIONAL | CANCELLED | Loaded by mistakes; archived, but removed from the active database; differs from decommissioned: Going to build a cable and changed mind |
| Cancelled | N/A | N/A | N/A | |
| ~~Issue Warning~~ | N/A | N/A | N/A | |
| ~~Issue Error~~ | | | | |

| A single state database Cable Status Values See Separate Tab | | | | |
|---|---|---|---|---|
| IE-In Effect | | | | |
| Live | ACTIVE | OPERATIONAL | N/A | Map to inventoryStatus = "ACTIVE" |
| | ACTIVE | OPERATIONAL | N/A | Live maps to inventoryStatus = "ACTIVE" |
| Design | PENDING | NON_OPERATIONAL | N/A | Map to inventoryStatus equal to "PENDING" |
| Pending | PENDING | NON_OPERATIONAL | N/A | |
| Pending-Termination | | | | |
| Vacant | | | | |
| Decommissioned | DECOMMISSIONED | NON_OPERATIONAL | CANCELLED | RETIRED_IN_PLACE: equipment is retired (like 7609), but stays in place, ,must be inventoried; fully depreciated in finance systems; "costs more to remove the equipment because it is useless<br>RETIRED (Under Investigation): On its way being archived or removed<br>ARCHIVED: Documented for a period of time |

LOGICAL CONNECTION

| Status Attribute Single status database Path Status Value | inventoryStatus (REQUIRED) | operationalStatus (REQUIRED) | detailedStatus* (OPTIONAL) | Definition of detailedStatus Value |
|---|---|---|---|---|
| Pending | PENDING | NON_OPERATIONAL | N/A | Path = Logical Connection |
| Planned | PENDING | NON_OPERATIONAL | N/A | |
| Reserved HM | Not Used | Not Used | Not Used | |
| Testing | PENDING | NON_OPERATIONAL | TESTING | Circuit undergoing validation testing (Bit Error Rate (BER), burn-in, Workflow status to update the three fields |
| Change | Not Used | Not Used | Not Used | |
| Active | ACTIVE | OPERATIONAL | N/A | Logical connection is active and operational. |
| Active-Reserved | ACTIVE | NON_OPERATIONAL | RESERVED | Tag and dangle: "ACTIVE_RESERVED" maps to "RESERVED" since we have invStatus = "ACTIVE"; Dark fiber; order n pairs, but use n-1 pairs, the one pair not being used is tagged as active reserved (tagged and dangled use case for circuits); Tagging and dangling of dark fiber; logical connection is present, but equipment may not be available; AT&T is being billed for it, but it is not in use |
| Active-DNSPD IN-PROG | ACTIVE | OPERATIONAL | DOWNSPEED | Decrease the Committed Information Rate (CIR) of an active, logical connection (i.e. circuit) |
| Active-UPSPD IN-PROG | ACTIVE | OPERATIONAL | UPSPEED | Increase the Committed Information Rate (CIR) of an active, logical connection (i.e. circuit) |
| Failed Activation | PENDING | NON_OPERATIONAL | FAILED_ACTIVATION | Failed activation of the circuit; Transport EMS (TEMS) activation has failed, but COULD be the equipment; circuit not working, but the cross-connects may not be working shows in Granite-NIS as active, but is it really? We will use PENDING instead. |
| Pending Decommission | ACTIVE | OPERATIONAL | PENDING_DECOMMISSION | |
| Decommissioned | DECOMMISSIONED | NON_OPERATIONAL | N/A | |

| | | | | |
|---|---|---|---|---|
| Cancelled | DECOMMISSIONED | NON_OPERATIONAL | CANCELLED | |
| ~~Pending Lock~~ | [Not Used in Model] | [Not Used in Model] | [Not Used in Model] | |
| ~~Model Warning~~ | [Not Used in Model] | [Not Used in Model] | [Not Used in Model] | |
| ~~Model Error~~ | [Not Used in Model] | [Not Used in Model] | [Not Used in Model] | |
| Archived | DECOMMISSIONED | NON_OPERATIONAL | ARCHIVED | Documented for a period of time; status value does not exist in -NIS |
| Single state database Path | | | | |
| Active | ACTIVE | OPERATIONAL | N/A | Logical connection is active and operational. ACTIVE + LIVE + IRE In Effect |
| Live | ACTIVE | OPERATIONAL | N/A | Logical connection is active and operational. ACTIVE + LIVE + IRE In Effect |
| IE-In Effect | ACTIVE | OPERATIONAL | N/A | Logical connection is active and operational. ACTIVE + LIVE + IRE In Effect |
| Protection | [Not Used in Model] | [Not Used in Model] | [Not Used in Model] | ~~Design of secondary circuits if primary circuit failed (if instance) - remove states~~ |
| Pending Disconnect | ACTIVE | OPERATIONAL | PENDING_DECOMMISSION | The logical connection is pending decommission. |
| ~~Pending Revision~~ | [Not Used in Model] | Not Used | [Not Used in Model] | ~~Status not needed (tbd)~~ |
| Design | PENDING | NON_OPERATIONAL | [Not Used in Model] | One status between design and pending (use pending) |
| Pending | PENDING | NON_OPERATIONAL | [Not Used in Model] | One status between design and pending (use pending) |
| Pending Design | PENDING | NON_OPERATIONAL | DESIGN | Design is a subset of pending |
| Pending Add | PENDING | NON_OPERATIONAL | ADD | Creation request of a new "create" logical connection request (versionNum = 1). Once complete, the inventoryStatus changes from "PENDING" to "ACTIVE"; design is complete; can start the circuit provisioning. Provides extra status information (ADD) on a pending order. |

Fig. 2P-3   296

| | | | |
|---|---|---|---|
| Pending Change | PENDING | NON_OPERATIONAL | CHANGE | Change requested on an active logical connection. Change will result in a new version of the logical connection (e.g., versionNum = 2). Once completed, the inventoryStatus for the change request (i.e., 'pending change') becomes "ACTIVE". Providing extra status information (CHANGE) on a pending order. |
| ~~Pending Cancel~~ | [Not Used in Model] | [Not Used in Model] | [Not Used in Model] | |
| ~~Pending Reassign~~ | [Not Used in Model] | [Not Used in Model] | [Not Used in Model] | |
| Cancelled | DECOMMISSIONED | NON_OPERATIONAL | CANCELLED | Order for logical connection was created by mistake (error), archived, but removed from the active database; differs from decommissioned |
| Disconnected | DECOMMISSIONED | NON_OPERATIONAL | | |
| FTTNdelete | [Not Used in Model] | Not Used | [Not Used in Model] | |
| Single state database Segment Status Values See Separate Tab | | | | Segment is covered in logical connection role... |
| Pending | PENDING | NON_OPERATIONAL | N/A | |
| ~~Planned~~ | PENDING | NON_OPERATIONAL | N/A | |
| ~~Provisioning~~ | Not Used | Not Used | Not Used | |
| ASR Submitted | PENDING | NON_OPERATIONAL | ASR_SUBMITTED | Access Service Request (ASR) submitted to 3rd party carrier |
| Ordered | PENDING | NON_OPERATIONAL | ASR_SUBMITTED | Ordered maps to "ASR_SUBMITTED" |
| DLR Received | PENDING | NON_OPERATIONAL | DLR_RECEIVED | ASR received, then FOC is performed |
| FOC Received | PENDING | NON_OPERATIONAL | FOC_RECEIVED | Firm Order Confirmation (FOC) Received from 3rd party carrier in response to ASR_SUBMITTED |

| | | | | |
|---|---|---|---|---|
| FOC Received | PENDING | NON_OPERATIONAL | FOC_RECEIVED | Firm Order Confirmation (FOC) Received from 3rd party carrier in response to ASR_SUBMITTED |
| Order Confirmed | PENDING | NON_OPERATIONAL | FOC_RECEIVED | Firm Order Confirmation (FOC) Received from 3rd party carrier in response to ASR_SUBMITTED |
| ~~Failed~~ | [Not Used in Model] | [Not Used in Model] | [Not Used in Model] | |
| Testing | PENDING | NON_OPERATIONAL | TESTING | Circuit undergoing validation testing (Bit Error Rate (BER), burn-in; Workflow status to update the three fields |
| ~~Change~~ | [Not Used in Model] | [Not Used in Model] | [Not Used in Model] | |
| Active | ACTIVE | OPERATIONAL | N/A | |
| ~~Active Received~~ | [Not Used in Model] | [Not Used in Model] | [Not Used in Model] | |
| DISCO ASR Issued | ACTIVE | OPERATIONAL | DISCO_ASR_ISSUED | Same as Path; not used Disconnect ASR issue; segment active; Providing 3rd party provider with a disconnect order |
| DISCO FOC Received | ACTIVE | OPERATIONAL | DISCO_FOC_RECEIVED | Disconnect Firm Order Commitment (FOC received; segment active; 3rd party carrier confirms order to disconnect |

CONNECTION ENDPOINT

| Single state database and -NIS Path Status Value | | | Path = Logical Connection |
|---|---|---|---|
| Pending | PENDING | NON_OPERATIONAL | N/A | |
| Planned | PENDING | NON_OPERATIONAL | N/A | |
| ~~Reserved-NIS~~ | [Not Used in model] | [Not Used in model] | [Not Used in model] | |
| Testing | PENDING | NON_OPERATIONAL | TESTING | Circuit undergoing validation testing (Bit Error Rate (BER), burn-in; Workflow status to update the three fields |
| ~~Change~~ | [Not Used in model] | [Not Used in model] | [Not Used in model] | |
| Active | ACTIVE | OPERATIONAL | N/A | Connection endpoint is active and operational. |
| Active-Reserved | ACTIVE | NON_OPERATIONAL | RESERVED | Tag and dangle; "ACTIVE_RESERVED" maps to "RESERVED" since we have inv0status = "ACTIVE"; Dark fiber: order n pairs, but use n-1 pairs, the one pair not being used is tagged as active reserved (tagged and dangled use cases for circuits).; Tagging and dangling of dark fiber; logical connection is present, but equipment may not be available. AT&T is being billed for it, but it is not in use |
| Pending_Decommission | ACTIVE | OPERATIONAL | PENDING_DECOMMISSION | The connection endpoint is pending decommission. |
| Decommissioned | DECOMMISSIONED | NON_OPERATIONAL | N/A | The connection endpoint has been decommissioned. |
| Pending Rearrange | [Not Used in model] | [Not Used in model] | [Not Used in model] | |
| Cancelled | DECOMMISSIONED | NON_OPERATIONAL | CANCELLED | Loaded by mistake; archived, but removed from the active database; differs from decommissioned |
| ~~Pending-Lock~~ | [Not Used in model] | [Not Used in model] | [Not Used in model] | |
| ~~Lock~~ | [Not Used in model] | [Not Used in model] | [Not Used in model] | |
| ~~Issue Warning~~ | [Not Used in model] | [Not Used in model] | [Not Used in model] | |
| ~~Issue Error~~ | [Not Used in model] | [Not Used in model] | [Not Used in model] | |
| Archived | DECOMMISSIONED | NON_OPERATIONAL | ARCHIVED | Documented for a period of time; status value does not exist in -NIS |

| Single state database Path | | | | |
|---|---|---|---|---|
| Active | ACTIVE | OPERATIONAL | N/A | Connection endpoint is active and operational. ACTIVE + LIVE + IRE in Effect |
| Live | ACTIVE | OPERATIONAL | N/A | Connection endpoint is active and operational. ACTIVE + LIVE + IRE in Effect |
| IE-In Effect | ACTIVE | OPERATIONAL | N/A | Connection endpoint is active and operational. ACTIVE + LIVE + IRE in Effect |
| Protection | [Not Used in model] | [Not Used in model] | [Not Used in model] | |
| Pending Disconnect | ACTIVE | OPERATIONAL | PENDING_DECOMMISSION | The connection endpoint is pending decommission. |
| Pending Restore | [Not Used in model] | [Not Used in model] | | |
| Design | PENDING | NON_OPERATIONAL | | One status between design and pending (use design) |
| Pending | PENDING | NON_OPERATIONAL | | One status between design and pending (use design) |
| Pending-Add | [Not Used in model] | [Not Used in model] | [Not Used in model] | |
| Pending-Cancel | [Not Used in model] | [Not Used in model] | [Not Used in model] | |
| Pending-Disconnect | [Not Used in model] | [Not Used in model] | [Not Used in model] | |
| Cancelled | DECOMMISSIONED | NON_OPERATIONAL | CANCELLED | Order for connection endpoint was created by mistake (error); archived, but removed from the active database; differs from decommissioned |
| Disconnected | DECOMMISSIONED | NON_OPERATIONAL | | |
| FTNdelete | Not Used | Not Used | Not Used | |

| Single state database Segment Status | | | | |
|---|---|---|---|---|
| Pending | PENDING | NON_OPERATIONAL | N/A | |
| Planned | PENDING | NON_OPERATIONAL | N/A | |
| Provisioning | [Not Used in model] | [Not Used in model] | [Not Used in model] | Segment is covered in logical connection rate ... |
| Fielded | [Not Used in model] | [Not Used in model] | [Not Used in model] | |
| Testing | PENDING | NON_OPERATIONAL | TESTING | Circuit undergoing validation testing (Bit Error Rate (BER), burn-in, Workflow status to update the three fields |
| Change | [Not Used in model] | [Not Used in model] | [Not Used in model] | |
| Active | ACTIVE | OPERATIONAL | N/A | Not Used |
| Active-Reserved | [Not Used in model] | [Not Used in model] | [Not Used in model] | Same as Path; not used |

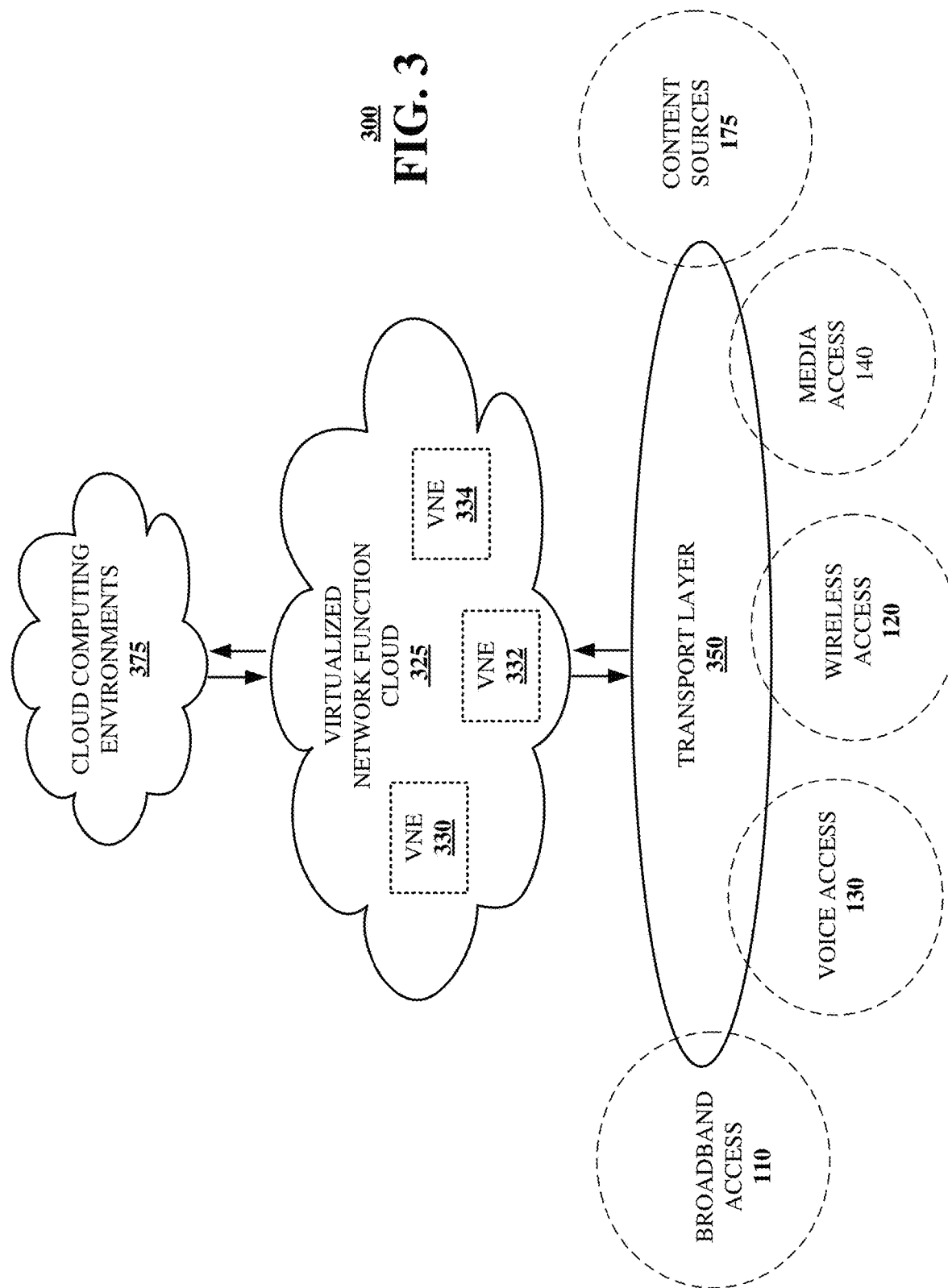

MULTI-STAGE STATE MODEL FOR THE ADMINISTRATION OF PHYSICAL, LOGICAL, AND HYBRID RESOURCES

CROSS REFERENCE TO RELATED APPLICATION(S)

This application claims the benefit of priority to U.S. Provisional Application No. 63/425,598, filed on Nov. 15, 2022. All sections of the aforementioned application(s) and/or patent(s) are incorporated herein by reference in their entirety.

FIELD OF THE DISCLOSURE

The subject disclosure relates to a multi-stage state model for the administration of physical, logical, and hybrid resources.

BACKGROUND

Network service providers provision equipment and other resources onto their network using a layering process. There are a set of logical conditioning activities that are performed on physical equipment before these equipment are considered to be production ready. There are also additional logical conditioning activities that are performed on the equipment resource before a customer can be provided a service. The inter-relationship of physical and logical activities becomes more complicated when deploying white boxes running a native operating system.

BRIEF DESCRIPTION OF THE DRAWINGS

Reference will now be made to the accompanying drawings, which are not necessarily drawn to scale, and wherein:

FIGS. 2B-2D depict illustrative embodiments of processes in accordance with various aspects described herein.

FIGS. 2F, 2G, 2H-1, 2H-2, 2I-1, and 2K-2 depict an illustrative embodiment of network resources and tracking data that can be managed in accordance with various aspects described herein.

FIG. 2J-1, FIG. 2J-2, FIG. 2K-1, FIG. 2K-3, FIG. 2K-4, FIG. 2L-1, FIG. 2L-2, FIG. 2L-3, FIG. 2M-1, FIG. 2M-2, FIG. 2N-1, FIG. 2N-2, FIG. 2N-3, FIG. 2N-4, FIG. 2O-1, FIG. 2O-2, FIG. 2P-1, FIG. 2P-2, FIG. 2P-3, FIG. 2P-4, FIG. 2Q-1, FIGS. 2Q-2 and 2Q-3 depict an illustrative embodiment of translations between models for network resources and tracking data that can be managed in accordance with various aspects described herein.

FIG. 3 is a block diagram illustrating an example, non-limiting embodiment of a virtualized communication network in accordance with various aspects described herein.

FIG. 4 is a block diagram of an example, non-limiting embodiment of a computing environment in accordance with various aspects described herein.

DETAILED DESCRIPTION

Figure 1:
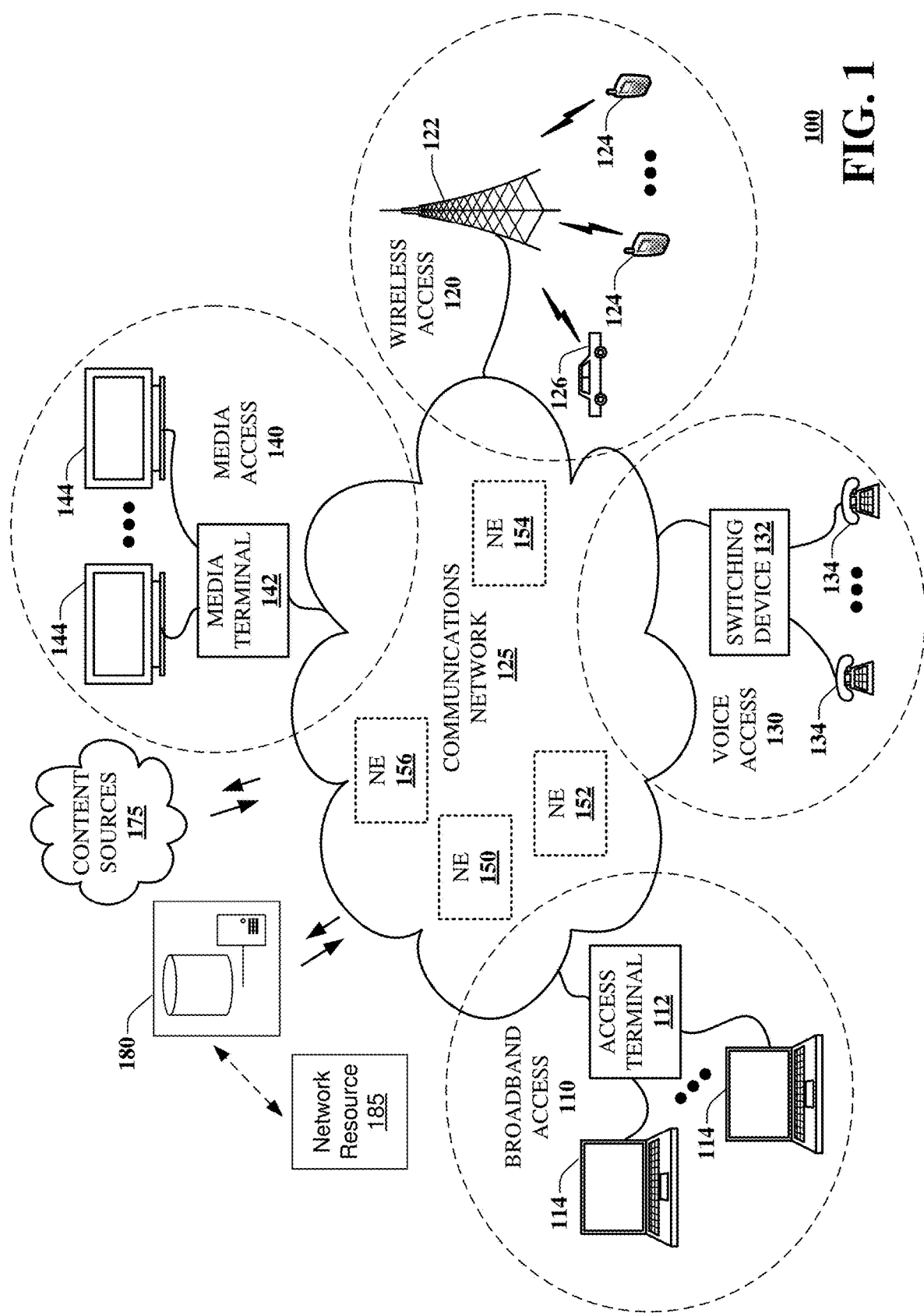
FIG. 1 is a block diagram illustrating an exemplary, non-limiting embodiment of a communications network in accordance with various aspects described herein.

The subject disclosure describes, among other things, illustrative embodiments for improving, by making more efficient and more robust, the management, adjustment and utilization of state (status) information on resources including network inventory resources. In one or more embodiments, the system and method can track and manage both the physical and logical activities associated with (e.g., performed on and/or performed by) resources. In one or more embodiments, the system and method can be used with Commercial Off-The-Shelf (COTS) products. In one or more embodiments, the system and method can be used with the COTS products which may or may not track physical and logical activities independently, and can determine when a hybrid resource is ready to provide service to a customer. In one or more embodiments, the system and method can accurately track a state of hybrid resources consisting of inter-meshed physical and logical elements, which can include determining when the physical, logical and hybrid activities are completed.

In one or more embodiments, the system and method can provide to network service providers (e.g., telecommunication providers) or other entities that provide communications services a comprehensive state model to track both the "as is" and "planned" network. In one or more embodiments through use of the comprehensive state model, the system and method can improve the organization's ability to track status information on resources managed within its network inventory DataBases Of Record (DBORs).

In one or more embodiments, the system and method can employ a comprehensive state model which is or includes a three-stage state model enabling the tracking of physical, logical, and hybrid activities associated with resources (of various or all types). The types of resources can vary according to the protocols and technologies being utilized, as well as the services being provided, and can include or be characterized as sites, equipment, equipment holders, cards, ports, physical connections, connection end points, and logical connections. Other types or categories of resources can also be included in or utilized by the comprehensive state model. In one or more embodiments, the comprehensive state model can utilize other categories of resources, including subcategories (e.g., wireless equipment, optical equipment, etc.) which may facilitate organizing the database and/or providing efficiency in maintaining the database, including tracking and providing access to the state information for the resource.

In one or more embodiments, the comprehensive state model has three common state attributes that provide an increasing level of detail about the state of the resource: 1. inventoryStatus; 2. operationalStatus; and 3. detailedStatus. For example, the most general level of status information can be represented in the inventoryStatus attribute, which can include a resource being ACTIVE, PENDING, or DECOMMISSIONED. As another example, the attribute operationalStatus can include a resource being OPERATIONAL or NON_OPERATIONAL. As an example, the value OPERATIONAL can include the resource being fully or partially operable after it completes appropriate certification activities, for example, system verification testing. In one embodiment, the determination of fully or partially operable can be based on thresholds, such as a threshold number of functions that the resource is capable of performing. In one or more embodiments, the threshold can be different for different types of resources (and can be adjustable such as by network administrators) and/or can be a percentage of operable functionality such as a resource that is capable of performing 100% of its expected functionality is deemed fully operable, a resource that is capable of performing 75% of its expected functionality is deemed partially operable, and a resource that is capable of performing only 1% of its expected functionality (or 0%) is deemed NON_OPERATIONAL. In one embodiment, the attribute operationalStatus can include a resource being determined to be OPERATIONAL or NON_OPERATIONAL based on standards or requirements of ITU-T X.731, the disclosure of which is hereby incorporated by reference. As another example, the attribute detailedStatus identifies a larger and more explicit set of values and can include indicating whether a resource has the ability for events/alerts or tickets to be generated and processed.

In one or more embodiments, the system and method can employ a comprehensive state model which extends and consolidates state (status) parameters (e.g., including parameters defined in international standards such as ITU-T X.731), and enhances capabilities within existing Service Provider DBORs. In one or more embodiments, the system and method can enhance out-of-the-box status capabilities available within COTS inventory solutions, by enabling physical, logical, and hybrid activities to be tracked in a coordinated fashion. This can enable a service provider to manage the "as is" (current) and "planned" (future) network within a common framework. Other embodiments are described in the subject disclosure.

One or more aspects of the subject disclosure include a device, comprising: a processing system including a processor; and a memory that stores executable instructions that, when executed by the processing system, facilitate performance of operations. The operations can include maintaining a database indicating states of network resources that is determined based on physical activities, logical activities and hybrid activities performed on or by the network resources. The operations can include obtaining activity information for a particular network resource, where the activity information is one of a physical activity, a logical activity or a hybrid activity. The operations can include determining whether the activity information corresponds to at least one of an inventory state, an operational state, or a detailed state. The operations can include, responsive to the activity information corresponding to the inventory state, adjusting the inventory state to one of active, pending or decommissioned based on the activity information. The operations can include, responsive to the activity information corresponding to the operational state, adjusting the operational state to one of operational or non-operational based on the activity information. The operations can include, responsive to the activity information corresponding to the detailed state, adjusting, based on the activity information, the detailed state to indicate an ability for the particular network resource to process events, alerts or tickets.

One or more aspects of the subject disclosure include a method receiving, over a network by a processing system including a processor, a notification indicating an event associated with a network resource. The method can include responsive to the notification, accessing, over the network by the processing system, a database to identify state information corresponding to the network resource, where the database stores states of network resources that are determined based on physical activities, logical activities and hybrid activities performed on or by the network resources. The method can include determining, by the processing system according to the state information, an inventory state, an operational state, and a detailed state for the network resource resulting in a multi-state determination. The method can include generating, by the processing system, a service ticket according to an analysis of the event and the multi-state determination.

One or more aspects of the subject disclosure include non-transitory machine-readable medium, comprising executable instructions that, when executed by a processing system including a processor, facilitate performance of operations. The operations can include maintaining a database that identifies states of network resources, where the states of the network resources are determined based on physical activities, logical activities and hybrid activities performed on or by the network resources. The operations can include receiving, from a network server, a state request for a particular network resource. The operations can include providing, to the network server, state information for the particular network resource comprising an inventory state, an operational state, and a detailed state, where the providing the state information causes the network server to delay generating or to not generate a service ticket.

Referring now to FIG. 1, a block diagram is shown illustrating an example, non-limiting embodiment of a system 100 in accordance with various aspects described herein. System 100 can include a database 180 (which can be a centralized or distributed database) that indicates states of network resources 185 (only one of which is shown) which are determined based on physical activities, logical activities and hybrid activities performed on or by the network resources. As an example, the database 180 can obtain (e.g., automatically and/or via user input) activity information for a particular network resource 185, where the activity information can be a physical activity, a logical activity and/or a hybrid activity. It can then be determined (e.g., by the database 180 or other computing device managing the database) as to whether the activity information corresponds to an inventory state, an operational state, and/or a detailed state.

In one embodiment, responsive to the activity information corresponding to the inventory state, the database 180 can adjust or maintain the inventory state as one of active, pending or decommissioned based on the activity information. In one embodiment, responsive to the activity information corresponding to the operational state, the database 180 can adjust or maintain the operational state to one of operational or non-operational based on the activity information. In one embodiment, responsive to the activity information corresponding to the detailed state, the database 180 can adjust or maintain, based on the activity information, the detailed state, which can include a status value indicating or otherwise representing a particular ability for the particular network resource to process events, alerts or tickets or other types of status values.

In one embodiment, the network resources 185 include sites, equipment, equipment holders, cards, ports, physical connections, connection end points, and logical connections. In one embodiment, the activity information includes one of designing, hardware ordering, building, equipment verification testing, or system verification testing. In one embodiment, the activity information includes one of base configuration, operating system installation, production configuration, or alarm verification.

In one embodiment, the particular network resource 185 is a site, and the activity information corresponding to the detailed state includes one of BUILD_IN_PROCESS, CANCELLED, CAPPED, INACTIVE_IN_CSS, RESERVED or PENDING_DECOMMISSION. In one embodiment, the particular network resource 185 is an equipment, and the activity information corresponding to the detailed state includes one of BUILD_IN_PROCESS, CANCELLED, CAPPED, COLD_SPARE, INACTIVE_IN_CSS, INSTALLED, NVTPROV, PENDING_DECOMMISSION, PREPROV, PROV, RETIRED_IN_PLACE, ARCHIVED, HOT_SPARE, RESERVED, ORDERED, WARM_SPARE, or RETIRED.

In one embodiment, the particular network resource 185 is an equipment holder, and the activity information corresponding to the detailed state includes one of BUILD_IN_PROCESS, CANCELLED, INACTIVE_IN_CSS, INSTALLED, PENDING_DECOMMISSION, RETIRED_IN_PLACE, ARCHIVED, RESERVED, ORDERED, or RETIRED. In one embodiment, the particular network resource 185 is a card, and the activity information corresponding to the detailed state includes one of BUILD_IN_PROCESS, CANCELLED, CAPPED, COLD_SPARE, INSTALLED, NVTPROV, PENDING_DECOMMISSION, PREPROV, PROV, RETIRED_IN_PLACE, ARCHIVED, RESERVED, ORDERED, or RETIRED.

In one embodiment, the particular network resource 185 is a port, and the activity information corresponding to the detailed state includes one of CANCELLED, INSTALLED, NVTPROV, PENDING_DECOMMISSION, PREPROV, PROV, RETIRED_IN_PLACE, ARCHIVED, DEFECTIVE, FAILED, RESERVED, SUSPECT, UNEQUIPPED, NOT_WIRED, WIRED_UNEQUIPPED, or ORDERED. In one embodiment, the particular network resource 185 is a physical connection, and the activity information corresponding to the detailed state includes one of CANCELLED, INSTALLED, PENDING_DECOMMISSION, RETIRED_IN_PLACE, ARCHIVED, RESERVED, ORDERED, or RETIRED.

In one embodiment, the particular network resource 185 is a connection endpoint, and the activity information corresponding to the detailed state includes one of CANCELLED, NVTPROV, PENDING_DECOMMISSION, PREPROV, PROV, ARCHIVED, TESTING, or RESERVED. In one embodiment, the particular network resource 185 is a logical connection, and the activity information corresponding to the detailed state includes one of DOWNSPEED, UPSPEED, ASR_SUBMITTED, CANCELLED, DISCO_ASR_ISSUED, DISCO_FOC_RECEIVED, FAILED_ACTIVATION, DLR_RECEIVED, FOC_RECEIVED, PENDING_DECOMMISSION, ARCHIVED, TESTING, RESERVED, DESIGN, ADD, or CHANGE.

In one embodiment, the obtaining the activity information for the particular network resource 185 comprises receiving a user input indicating completion of the physical activity, the logical activity or the hybrid activity, such as from a technician tasked to complete the activity. In this example, the user input can be in various forms including entries into work-flow software managing a build-out or maintenance of the network. In one embodiment, the obtaining the activity information for the particular network resource 185 comprises receiving, over a network from the particular network resource, an activity completion message indicating completion of the physical activity, the logical activity and/or the hybrid activity. For example, when a logical activity is completed, the network resource may automatically provide a completion message to the database 180 or to another device associated with the workflow.

For example, system 100 can facilitate in whole or in part a database being maintained that has information indicating states of network resources, which can be determined based on physical activities, logical activities and hybrid activities performed on or by the network resources; obtaining activity information for a particular network resource, where the activity information is a physical activity, a logical activity and/or a hybrid activity; and determining whether a state change for the particular network resource should be made such as to whether the activity information corresponds to and warrants change to at least one of an inventory state, an operational state, or a detailed state.

In particular, a communications network 125 is presented for providing broadband access 110 to a plurality of data terminals 114 via access terminal 112, wireless access 120 to a plurality of mobile devices 124 and vehicle 126 via base station or access point 122, voice access 130 to a plurality of telephony devices 134, via switching device 132 and/or media access 140 to a plurality of audio/video display devices 144 via media terminal 142. In addition, communication network 125 is coupled to one or more content sources 175 of audio, video, graphics, text and/or other media. While broadband access 110, wireless access 120, voice access 130 and media access 140 are shown separately, one or more of these forms of access can be combined to provide multiple access services to a single client device (e.g., mobile devices 124 can receive media content via media terminal 142, data terminal 114 can be provided voice access via switching device 132, and so on).

The communications network 125 includes a plurality of network elements (NE) 150, 152, 154, 156, etc. for facilitating the broadband access 110, wireless access 120, voice access 130, media access 140 and/or the distribution of content from content sources 175. The communications network 125 can include a circuit switched or packet switched network, a voice over Internet protocol (VoIP) network, Internet protocol (IP) network, a cable network, a passive or active optical network, a 4G, 5G, or higher generation wireless access network, WIMAX network, UltraWideband network, personal area network or other wireless access network, a broadcast satellite network and/or other communications network.

In various embodiments, the access terminal 112 can include a digital subscriber line access multiplexer (DSLAM), cable modem termination system (CMTS), optical line terminal (OLT) and/or other access terminal. The data terminals 114 can include personal computers, laptop computers, netbook computers, tablets or other computing devices along with digital subscriber line (DSL) modems, data over coax service interface specification (DOCSIS) modems or other cable modems, a wireless modem such as a 4G, 5G, or higher generation modem, an optical modem and/or other access devices.

In various embodiments, the base station or access point 122 can include a 4G, 5G, or higher generation base station, an access point that operates via an 802.11 standard such as 802.11n, 802.11ac or other wireless access terminal. The mobile devices 124 can include mobile phones, e-readers, tablets, phablets, wireless modems, and/or other mobile computing devices.

In various embodiments, the switching device 132 can include a private branch exchange or central office switch, a media services gateway, VoIP gateway or other gateway device and/or other switching device. The telephony devices 134 can include traditional telephones (with or without a terminal adapter), VoIP telephones and/or other telephony devices.

In various embodiments, the media terminal 142 can include a cable head-end or other TV head-end, a satellite receiver, gateway or other media terminal 142. The display devices 144 can include televisions with or without a set top box, personal computers and/or other display devices.

In various embodiments, the content sources 175 include broadcast television and radio sources, video on demand platforms and streaming video and audio services platforms, one or more content data networks, data servers, web servers and other content servers, and/or other sources of media.

In various embodiments, the communications network 125 can include wired, optical and/or wireless links and the network elements 150, 152, 154, 156, etc. can include service switching points, signal transfer points, service control points, network gateways, media distribution hubs, servers, firewalls, routers, edge devices, switches and other network nodes for routing and controlling communications traffic over wired, optical and wireless links as part of the Internet and other public networks as well as one or more private networks, for managing subscriber access, for billing and network management and for supporting other network functions.

Figure 2A:
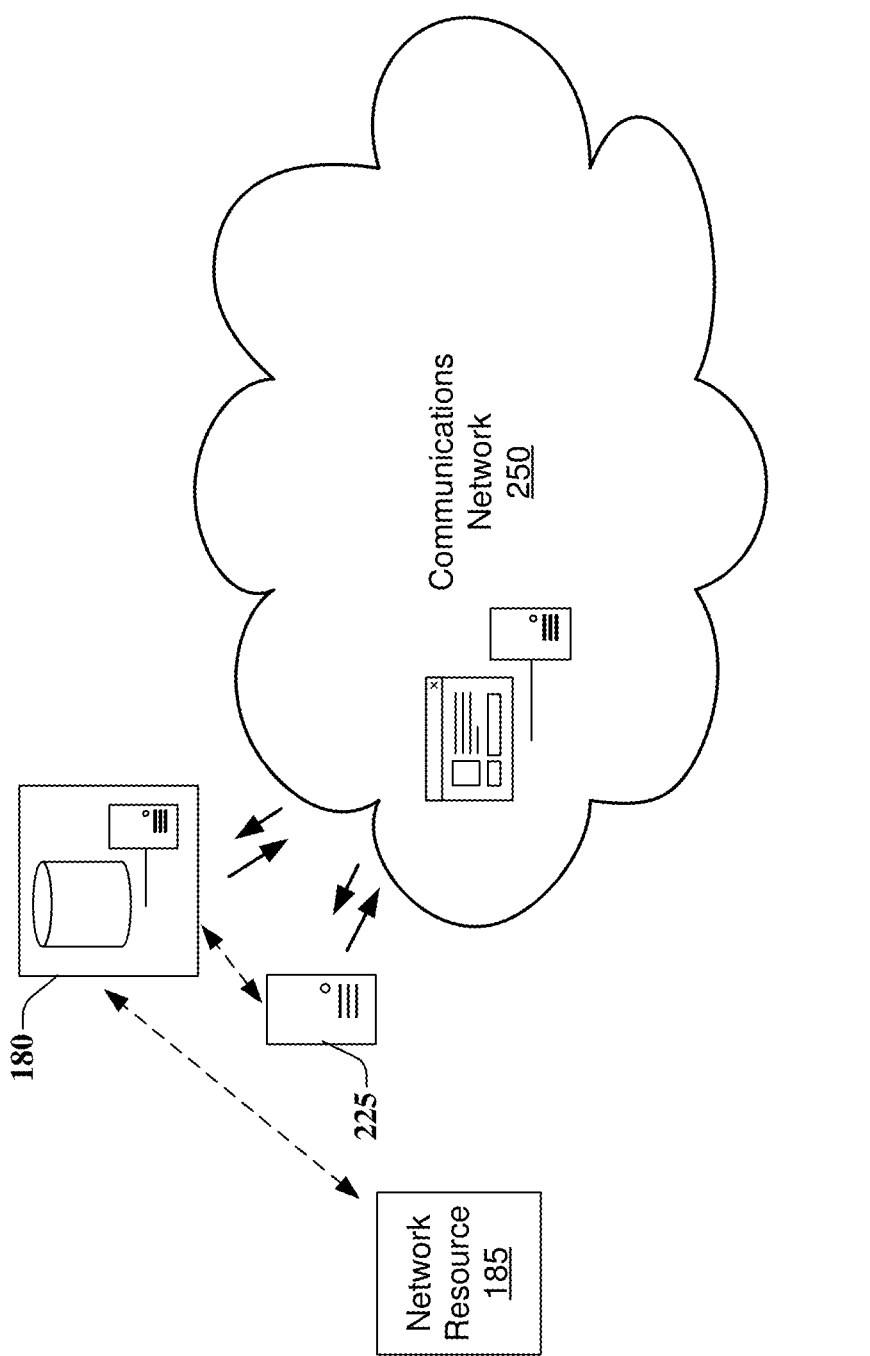
FIG. 2A is a block diagram illustrating an example, non-limiting embodiment of a system functioning within the communication network of FIG. 1 in accordance with various aspects described herein.

FIG. 2A is a block diagram illustrating an example, non-limiting embodiment of a system 200 functioning within the communication network of FIG. 1 in accordance with various aspects described herein. System 200 can include the database 180 that indicates states of network resources 185, which are determined based on physical activities, logical activities and hybrid activities performed on or by the network resources.

In one embodiment, a server 225 (or other computing device or functionality including a virtual machine(s)) can receive (e.g., over network 250) a notification or other data indicating or representing an event (including a condition) associated with the network resource 185. As an example, the notification or the event can be an alarm that has been triggered and that is associated with the network resource 185 (e.g., via being determined/estimated/predicted). Responsive to the notification, the server 225 can access (e.g., over the network 250) the database 180 to identify state information corresponding to the network resource, where the database stores states of network resources that are determined based on physical activities, logical activities and hybrid activities performed on or by the network resources. For example, the database can provide the server 225 with up-to-date state information for inventory state, operational state, and detailed state corresponding to the network resource 185.

In one embodiment, the server 225 can determine (or otherwise receive), according to the state information, the inventory state, the operational state, and the detailed state for the network resource 185 resulting in a multi-state determination. The server 225 can then determine whether a service ticket (or other mitigating action) should be generated according to an analysis of the event and/or the multi-state determination.

In one embodiment, the server 225 can provide, over the network 250, the service ticket to equipment of a technician, such as where the inventory state is active, where the operational state is operational, and wherein the event is an alarm.

In one embodiment, the server 225 can receive, over the network 250, another notification indicating another event associated with the network resource 185 or another network resource. In this example, after accessing the database 180 and determining (or receiving) the inventory state, the operational state, and the detailed state for the same or a different network resource 185 resulting in another multi-state determination, the server 225 can then determine to delay generating (or to not generate) a service ticket according to an analysis of the event and/or the other multi-state determination, such as where the operational state is non-operational.

In one or more embodiments, the methods and systems can track the physical activities for resources that need to be turned up, and can tie that information with logical activities that are performed and associated with the equipment, as well as any provisioning activities that occur. For example, the methods and systems do not divorce or separate logical activities from physical activities, but rather track logical, physical and hybrid status information tied together in the turn up of a piece of equipment or other network resource including a function. In one or more embodiments, the methods and systems can use three state parameters to represent a consistent state regardless of whether the device is physical, logical, or hybrid.

In one or more embodiments, the methods and systems described herein, which use a comprehensive state model enabling the tracking of physical, logical, and hybrid activities associated with resources (of various or all types), is more robust, efficient, informative and cost-effective than current tracking methodologies that only track certain activities or separate physical and logical activities, and which track a network device state in only one field. In one embodiment, sites can be tracked which includes central offices, cell sites, and so forth. In one embodiment, equipment can be tracked which includes servers, routers, DSLAMs, patch panels, or other devices or hardware such as at the chassis level. In one embodiment, cards can be tracked which includes plugins into the chassis.

In one or more embodiments, the multi-state comprehensive model is an improvement over a single field model which can result in an unclear understanding of the status of the network resource.

In one or more embodiments, the multi-state comprehensive model enables understanding particular events surrounding the network resource, such as a network resource that is undergoing maintenance, but is still active and operational although temporarily not available for use.

In one or more embodiments, the multi-state comprehensive model allows efficient use of other resources in network management, such as knowing the difference between a received alarmed from a site that has not yet been turned up as opposed to a received alarmed from a site that has been turned up, which may warrant swifter action, including assigning a team to investigate, testing, and so forth. In one or more embodiments, other systems (e.g., a service ticket system, an analysis system, a technician dispatch system) can coordinate or otherwise make use of the multi-state model of database 180 to facilitate managing the network, including more efficiently assigning resources (including technicians) for resolving perceived faults or problems, more effectively managing and adjusting network build-outs, and so forth. In one embodiment, database 180 can be updated automatically (e.g., changing one or more of the states of a network resource) based on performance of a particular orchestration step. In one embodiment, database 180 or the information accessible in database 180 can be utilized for historic tracking of state changes and/or physical, logical and/or hybrid activities, such as through obtaining a change log.

Figure 2B:
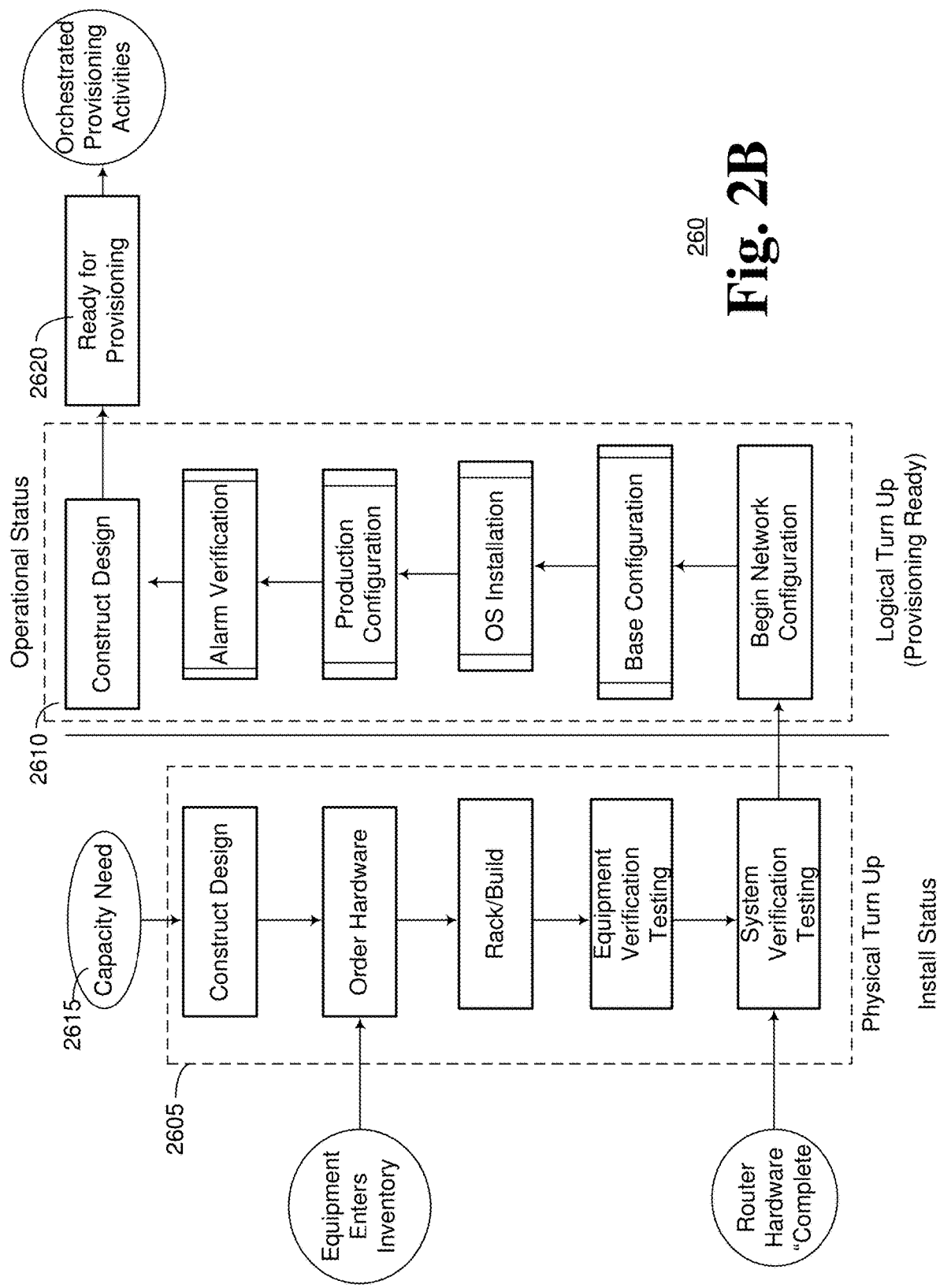

FIG. 2B depicts an illustrative embodiment of a process 260 in accordance with various aspects described herein. The process 260 illustrates a turn up for a router which can be tracked and managed utilizing a state model. As can be seen in process 260, there are physical turn up steps 2605 and logical turn up steps 2610. In one or more embodiments, some or all of the physical and logical (and hybrid) turn up steps can be tracked to facilitate management of the network. For example, process 260 shows that a capacity need is identified at 2615; and at 2605: a design is created; equipment ordered; the equipment is installed; the equipment/system is verified; and then the network service provider hands it over to a team or other group for a logical construction on that physical box, which can include at 2610 base configuration, OS installation, production configuration, and alarm configuration. The router is then ready for provisioning at 2620. These various stages of process 260 can be represented by the three-state model, such as a router that is ready for provisioning being identified as active/operational/provisioned. In contrast, if process 260 is at a point where an OS is being installed and an alarm is triggered that flags this particular router being turned up then the system (e.g., system 225 in FIG. 2A) could automatically access the database 180 to identify that the router is at OS installation stage, and may determine that a service ticket is not warranted.

In one or more embodiments, support contracts may start when a network resource (e.g., a router) is at a ready for provisioning, while production support contracts take effect after the router goes into production or PROV. In this example, the information in database 180 can be utilized to identify a third-party source of assistance, such as from an ordering contract, on the particular equipment rather than from a production contract. In one or more embodiments, process 260 is tied to a workflow, so that each of the steps is part of a workflow, and the multi-state model can represent a position in a workflow delivery process (and can be utilized by other devices or systems to facilitate management of the network such as determining whether service tickets are warranted for a particular network resource).

In one embodiment, the router of process 260 can go through the workflow stages towards becoming operational, such as base configuration, OS installation, and production configuration, but may not yet have gone through alarm verification/validation. In other embodiments, the alarm verification/validation may have been completed. These different stages in process 260 can be identified by accessing the database 180 such as seeing that the router is one of: PENDING/NON_OPERATIONAL/PREPROV; ACTIVE/OPERATIONAL/NVT_PROV; or ACTIVE/OPERATIONAL/PROV.

In one embodiment, various states including active, pending and decommissioned can be tracked through use of a database. These states can be determined based on physical activities, logical activities and hybrid activities performed on or by the network resources. One or more of the inventory state, the operational state, and/or the detailed state can be adjusted according to activity information provided to or otherwise obtained by the database.

Figure 2C:
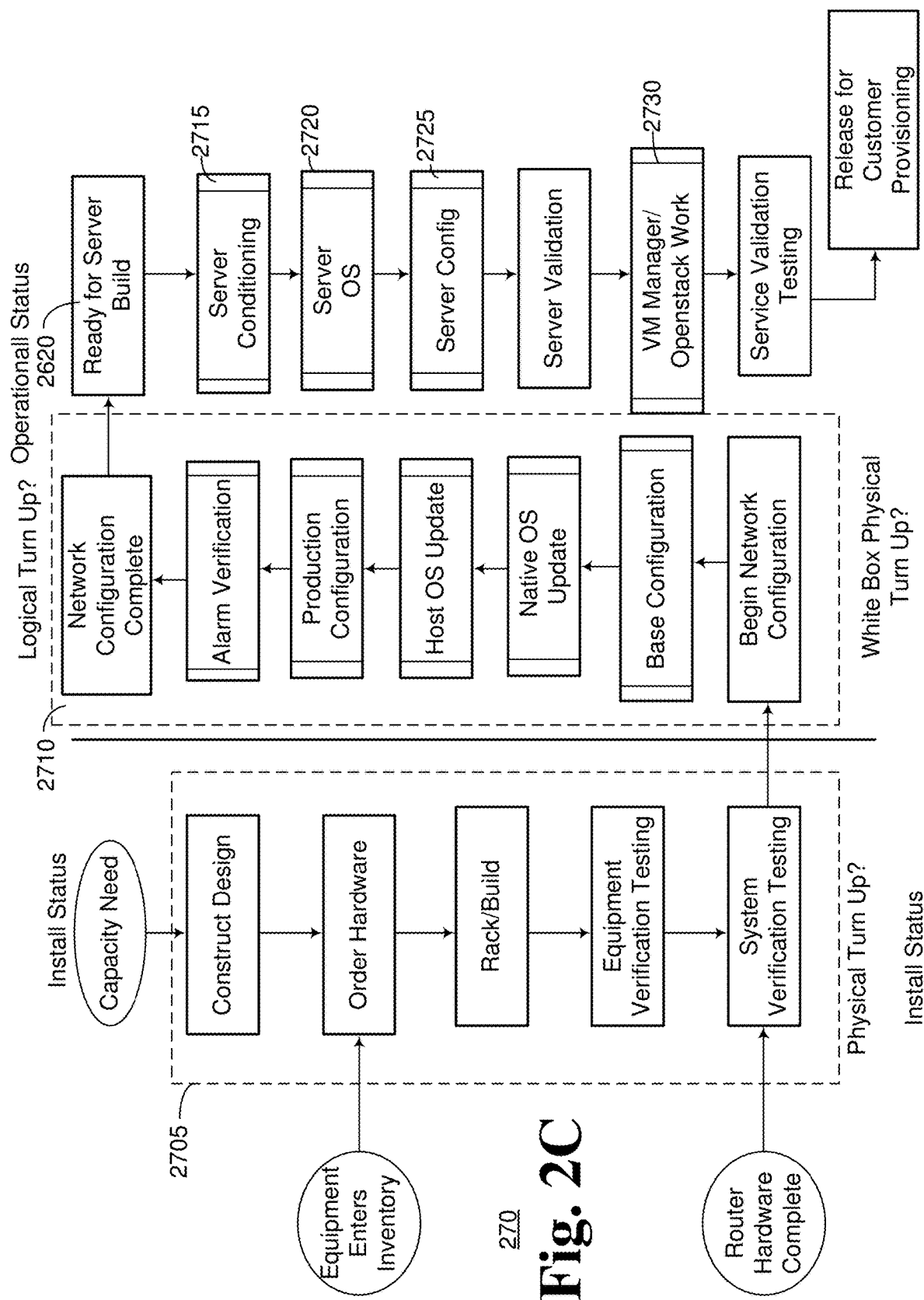

FIG. 2C depicts an illustrative embodiment of a process 270 in accordance with various aspects described herein. The process 270 illustrates a turn up for a network cloud pod which can be tracked and managed utilizing a state model that can be maintained in database 180. The different stages of process 270 can be identified by accessing the database 180.

As an example, the network cloud pod can be or otherwise include a white box architecture which utilizes multiple pieces of equipment in order to turn it up. For example, merchant silicon with a native OS can be obtained from a vendor. The physical turn up at 2705 can be implemented but with multiple pieces of equipment for the network cloud pod, such as routers, switches, and servers. The comprehensive state model described herein has the ability to represent the stages that have been completed, which can be numerous and can be performed by different groups of the network provider, including after the logical turn up at 2710, providing the workflow over to a server group that performs conditioning 2715, OS update and installation 2720 and configurations 2725 which then results in or allows for virtual machine installation 2730. In one embodiment, the comprehensive model enables representing the state of the entire pod and the state of each of the equipment independently, including from a physical, logical and hybrid perspective.

In one embodiment, the pod can be at a lower stage in the workflow (as represented by the comprehensive model) while some of the individual equipment are at a higher stage. In one embodiment, the pod can be in an active/non-operational state (and the detailed state can vary depending on the particular stage of the workflow) but one, some or all of the individual equipment are at different states (e.g., ACTIVE/OPERATIONAL/PROV OR NVT_PROV).

In one embodiment, the state information in the comprehensive model can be utilized to determine bottle-necks or other inefficiencies in pod work-flows or other work-flows where multiple network resources are being aggregated, such as automatically checking each of the individual network resources to identify any that are in lower stages of the workflow.

In one embodiment, various states including active, pending and decommissioned can be tracked through use of a database. These states can be determined based on physical activities, logical activities and hybrid activities performed on or by the network resources. One or more of the inventory state, the operational state, and/or the detailed state can be adjusted according to activity information provided to or otherwise obtained by the database.

FIG. 2D depicts an illustrative embodiment of a process 280 in accordance with various aspects described herein. The process 280 illustrates a logical connection and a state model that can track it, such as for fiber broadband related services, including for different versions (e.g., V1 and V2), where the state model can be maintained in database 180. The different stages of process 280 can be identified by accessing the database 180.

In one embodiment, various states including active, pending and decommissioned can be tracked through use of a database. These states can be determined based on physical activities, logical activities and hybrid activities performed on or by the network resources. One or more of the inventory state, the operational state, and/or the detailed state can be adjusted according to activity information provided to or otherwise obtained by the database, such as physical deletion, cancellation, creation, activation, disconnection, and so forth, which are depicted in the various potential steps/workflow of the logical connection.

Figure 2E:
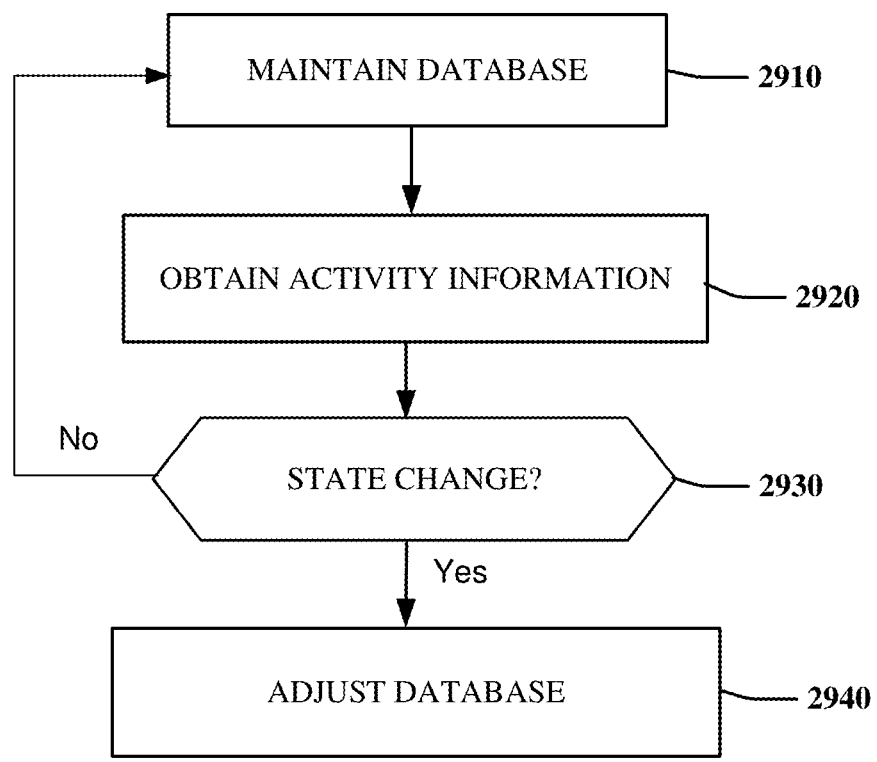
FIG. 2E depicts an illustrative embodiment of a method in accordance with various aspects described herein.

FIG. 2E depicts an illustrative embodiment of a method 290 in accordance with various aspects described herein. At 2910, a database (e.g., database 180) can be maintained having information indicating states of network resources. These states can be determined based on physical activities, logical activities and hybrid activities performed on or by the network resources. At 2920, activity information can be obtained for a particular network resource, where the activity information is a physical activity, a logical activity and/or a hybrid activity. At 2930, a state change for the particular network resource can be determined or a determination can be made as to whether no state adjustment is warranted. For example, a determination can be made as to whether the activity information corresponds to at least one of an inventory state, an operational state, or a detailed state. At 2940, the inventory state, the operational state, and/or the detailed state can be adjusted according to the activity information.

For example, responsive to the activity information corresponding to the inventory state, the inventory state can be adjusted to one of active, pending or decommissioned based on the activity information. As another example, responsive to the activity information corresponding to the operational state, the operational state can be adjusted to one of operational or non-operational based on the activity information. As yet another example, responsive to the activity information corresponding to the detailed state, the detailed state can be adjusted (e.g., based on the activity information) to indicate an ability for the particular network resource to process events, alerts or tickets.

While for purposes of simplicity of explanation, the respective processes are shown and described as a series of blocks in FIG. 2E, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

FIGS. 2F, 2G, 2H-1, 2H-2, 2I-1, and 2K-2 depict an illustrative embodiment of network resources that can be tracked according to a three-state model (and examples of model values 293-295 available to each of the types of resources) in accordance with various aspects described herein, which can be maintained in database 180. As an example, the detailed state for one, some or all of the network resources (e.g., sites, equipment, equipment holders, ports, physical connections, connection endpoints, logical connections) can identify one or more of the following: DOWNSPEED; UPSPEED; ASR_SUBMITTED; BUILD_IN_PROCESS; CANCELLED; CAPPED; COLD_SPARE; DISCO_ASR_ISSUED; DISCO_FOC_RECEIVED; FAILED_ACTIVATION; DLR_RECEIVED; FOC_RECEIVED; INACTIVE_IN_CSS; INSTALLED; NVTPROV; PENDING_DECOMMISSION; PREPROV; PROV; RETIRED_IN_PLACE; ARCHIVED; TESTING; HOT_SPARE; DEFECTIVE; FAILED; RESERVED; SUSPECT; UNEQUIPPED; NOT_WIRED; WIRED_UNEQUIPPED; ORDERED; DESIGN; ADD; CHANGE; LOCKED; UNLOCKED; SHUTTING_DOWN; WARM_SPARE; RETIRED.

One or more of the status identifiers may be applicable only to particular network resources, such as down speed, up speed, and ASR submitted that is only applicable to logical connections, while a build in process label may only be applicable to sites, physical equipment, equipment holders and cards. In one or more embodiments, the comprehensive state model can be extended to have more detailed status values, where the extension can be based on various factors including different or more physical logical and hybrid activities being performed on or by the physical resources, different types of functionality of the network resources, or other the addition of other resource characteristics that can be identified and tracked by the comprehensive model.

FIG. 2J-1, FIG. 2J-2, FIG. 2K-1, FIG. 2K-3, FIG. 2K-4, FIG. 2L-1, FIG. 2L-2, FIG. 2L-3, FIG. 2M-1, FIG. 2M-2, FIG. 2N-1, FIG. 2N-2, FIG. 2N-3, FIG. 2N-4, FIG. 2O-1, FIG. 2O-2, FIG. 2P-1, FIG. 2P-2, FIG. 2P-3, FIG. 2P-4, FIG. 2Q-1, FIGS. 2Q-2 and 2Q-3 depict an illustrative embodiment of translations 296 from a single model state descriptor for network resources (e.g., sites, equipment, equipment holders, cards, ports, physical connections, connection endpoints, and logical connections) into the data/model values 293-295 that can be managed in the database 180 in accordance with various aspects described herein. In one or more embodiments, the types of network resources, the data model values 293-295, and/or the number of states (e.g., three) can be adjusted, including being increased, which can provide more granularity into tracking and monitoring the network, including network resources that are being turned up or otherwise added into the network. In one or more embodiments, the translations 296 can be changed depending on changes to the characteristics of the underlying single model state descriptor, changes to the hardware and/or functionality of the particular network resource, changes to policies as to how the network resource is to be managed, and/or based on other characteristics, which can improve the accuracy and efficiency of the comprehensive multi-state (e.g., three) model.

In one embodiment, the method and systems can provide a comprehensive multi-state model that in essence ingests or otherwise is representative of information identified in a number (e.g., over 50) of different databases associated with a network service provider where the multi-state model applies across different network resources and the different databases. In one embodiment, the comprehensive multi-state model utilizes a common set of state variables that apply for some or all of various types of network resources. In one embodiment, the method and systems can provide a comprehensive multi-state model that can track and monitor a set of objects of a network (including physical objects, logical object, and hybrid objects) that the network is using (or will be using) to deliver services over the network.

Referring now to FIG. 3, a block diagram 300 is shown illustrating an example, non-limiting embodiment of a virtualized communication network in accordance with various aspects described herein. In particular a virtualized communication network is presented that can be used to implement (including tracking and generating) some or all of the subsystems and functions of system 100, the subsystems and functions of system 200, processes 260, 270, 280, model values 293-295, translations 296, and method 290 presented in FIGS. 1, 2A-2Q and 3. For example, virtualized communication network 300 can facilitate in whole or in part the database 180 being maintained that has information indicating states of network resources, which can be determined based on physical activities, logical activities and hybrid activities performed on or by the network resources; obtaining activity information for a particular network resource, where the activity information is a physical activity, a logical activity and/or a hybrid activity; and determining whether a state change for the particular network resource should be made such as to whether the activity information corresponds to and warrants change to at least one of an inventory state, an operational state, or a detailed state.

In particular, a cloud networking architecture is shown that leverages cloud technologies and supports rapid innovation and scalability via a transport layer 350, a virtualized network function cloud 325 and/or one or more cloud computing environments 375. In various embodiments, this cloud networking architecture is an open architecture that leverages application programming interfaces (APIs); reduces complexity from services and operations; supports more nimble business models; and rapidly and seamlessly scales to meet evolving customer requirements including traffic growth, diversity of traffic types, and diversity of performance and reliability expectations.

In contrast to traditional network elements—which are typically integrated to perform a single function, the virtualized communication network employs virtual network elements (VNEs) 330, 332, 334, etc. that perform some or all of the functions of network elements 150, 152, 154, 156, etc. For example, the network architecture can provide a substrate of networking capability, often called Network Function Virtualization Infrastructure (NFVI) or simply infrastructure that is capable of being directed with software and Software Defined Networking (SDN) protocols to perform a broad variety of network functions and services. This infrastructure can include several types of substrates. The most typical type of substrate being servers that support Network Function Virtualization (NFV), followed by packet forwarding capabilities based on generic computing resources, with specialized network technologies brought to bear when general-purpose processors or general-purpose integrated circuit devices offered by merchants (referred to herein as merchant silicon) are not appropriate. In this case, communication services can be implemented as cloud-centric workloads.

As an example, a traditional network element 150 (shown in FIG. 1), such as an edge router can be implemented via a VNE 330 composed of NFV software modules, merchant silicon, and associated controllers. The software can be written so that increasing workload consumes incremental resources from a common resource pool, and moreover so that it is elastic: so, the resources are only consumed when needed. In a similar fashion, other network elements such as other routers, switches, edge caches, and middle boxes are instantiated from the common resource pool. Such sharing of infrastructure across a broad set of uses makes planning and growing infrastructure easier to manage.

In an embodiment, the transport layer 350 includes fiber, cable, wired and/or wireless transport elements, network elements and interfaces to provide broadband access 110, wireless access 120, voice access 130, media access 140 and/or access to content sources 175 for distribution of content to any or all of the access technologies. In particular, in some cases a network element needs to be positioned at a specific place, and this allows for less sharing of common infrastructure. Other times, the network elements have specific physical layer adapters that cannot be abstracted or virtualized and might require special DSP code and analog front ends (AFEs) that do not lend themselves to implementation as VNEs 330, 332 or 334. These network elements can be included in transport layer 350.

The virtualized network function cloud 325 interfaces with the transport layer 350 to provide the VNEs 330, 332, 334, etc. to provide specific NFVs. In particular, the virtualized network function cloud 325 leverages cloud operations, applications, and architectures to support networking workloads. The virtualized network elements 330, 332 and 334 can employ network function software that provides either a one-for-one mapping of traditional network element function or alternately some combination of network functions designed for cloud computing. For example, VNEs 330, 332 and 334 can include route reflectors, domain name system (DNS) servers, and dynamic host configuration protocol (DHCP) servers, system architecture evolution (SAE) and/or mobility management entity (MME) gateways, broadband network gateways, IP edge routers for IP-VPN, Ethernet and other services, load balancers, distributers and other network elements. Because these elements do not typically need to forward large amounts of traffic, their workload can be distributed across a number of servers—each of which adds a portion of the capability, and which creates an elastic function with higher availability overall than its former monolithic version. These virtual network elements 330, 332, 334, etc. can be instantiated and managed using an orchestration approach similar to those used in cloud compute services.

The cloud computing environments 375 can interface with the virtualized network function cloud 325 via APIs that expose functional capabilities of the VNEs 330, 332, 334, etc. to provide the flexible and expanded capabilities to the virtualized network function cloud 325. In particular, network workloads may have applications distributed across the virtualized network function cloud 325 and cloud computing environment 375 and in the commercial cloud or might simply orchestrate workloads supported entirely in NFV infrastructure from these third-party locations.

Figure 4:
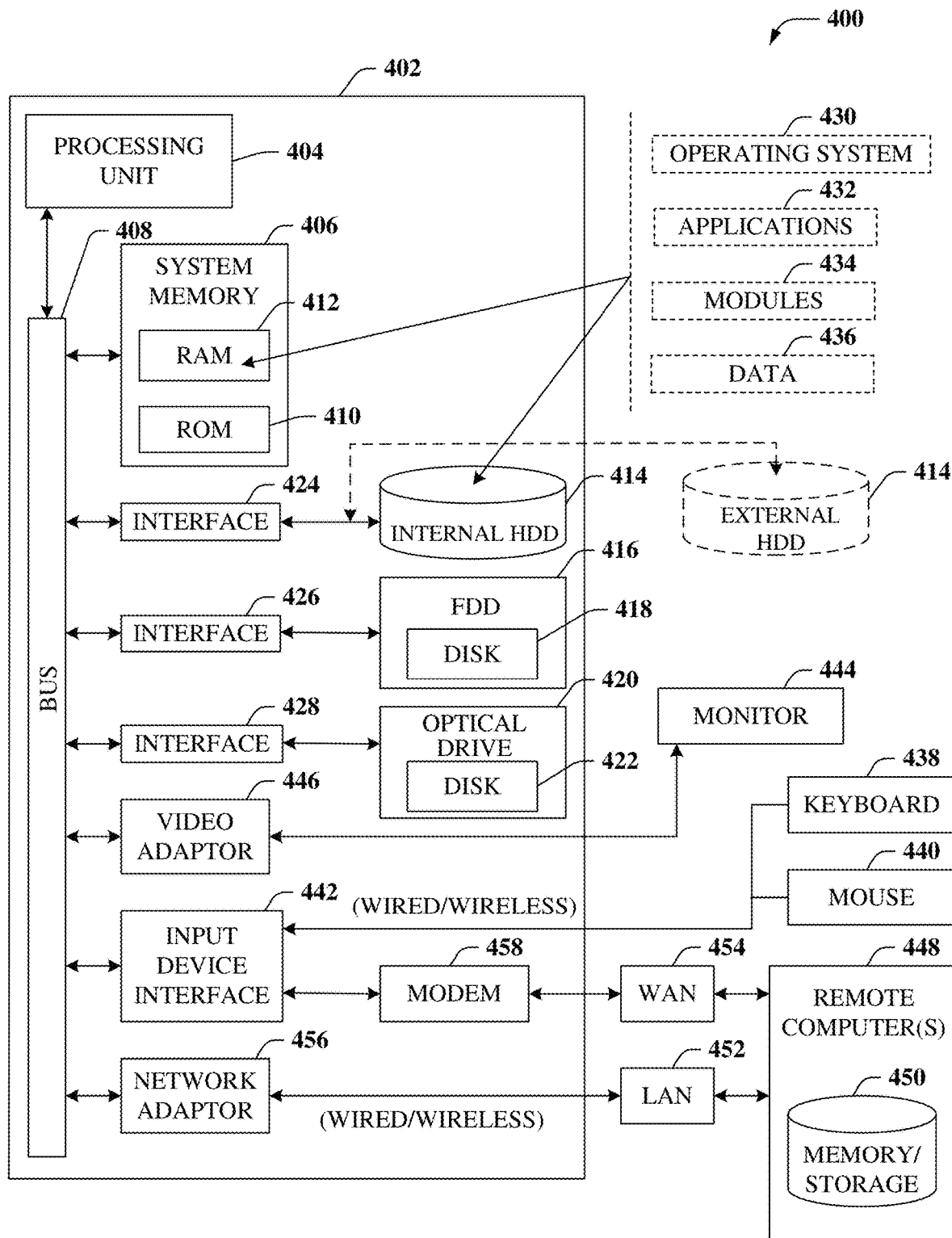

Turning now to FIG. 4, there is illustrated a block diagram of a computing environment in accordance with various aspects described herein. In order to provide additional context for various embodiments of the embodiments described herein, FIG. 4 and the following discussion are intended to provide a brief, general description of a suitable computing environment 400 in which the various embodiments of the subject disclosure can be implemented. In particular, computing environment 400 can be used in the implementation of network elements 150, 152, 154, 156, access terminal 112, base station or access point 122, switching device 132, media terminal 142, and/or VNEs 330, 332, 334, etc. Each of these devices can be implemented via computer-executable instructions that can run on one or more computers, and/or in combination with other program modules and/or as a combination of hardware and software. For example, computing environment 400 can facilitate in whole or in part the database 180 being maintained that has information indicating states of network resources, which can be determined based on physical activities, logical activities and hybrid activities performed on or by the network resources; obtaining activity information for a particular network resource, where the activity information is a physical activity, a logical activity and/or a hybrid activity; and determining whether a state change for the particular network resource should be made such as to whether the activity information corresponds to and warrants change to at least one of an inventory state, an operational state, or a detailed state.

Generally, program modules comprise routines, programs, components, data structures, etc., that perform particular tasks or implement particular abstract data types. Moreover, those skilled in the art will appreciate that the methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes one or more processors as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 4, the example environment can comprise a computer 402, the computer 402 comprising a processing unit 404, a system memory 406 and a system bus 408. The system bus 408 couples system components including, but not limited to, the system memory 406 to the processing unit 404. The processing unit 404 can be any of various commercially available processors. Dual microprocessors and other multiprocessor architectures can also be employed as the processing unit 404.

The system bus 408 can be any of several types of bus structure that can further interconnect to a memory bus (with or without a memory controller), a peripheral bus, and a local bus using any of a variety of commercially available bus architectures. The system memory 406 comprises ROM 410 and RAM 412. A basic input/output system (BIOS) can be stored in a non-volatile memory such as ROM, erasable programmable read only memory (EPROM), EEPROM, which BIOS contains the basic routines that help to transfer information between elements within the computer 402, such as during startup. The RAM 412 can also comprise a high-speed RAM such as static RAM for caching data.

The computer 402 further comprises an internal hard disk drive (HDD) 414 (e.g., EIDE, SATA), which internal HDD 414 can also be configured for external use in a suitable chassis (not shown), a magnetic floppy disk drive (FDD) 416, (e.g., to read from or write to a removable diskette 418) and an optical disk drive 420, (e.g., reading a CD-ROM disk 422 or, to read from or write to other high-capacity optical media such as the DVD). The HDD 414, magnetic FDD 416 and optical disk drive 420 can be connected to the system bus 408 by a hard disk drive interface 424, a magnetic disk drive interface 426 and an optical drive interface 428, respectively. The hard disk drive interface 424 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 402, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 412, comprising an operating system 430, one or more application programs 432, other program modules 434 and program data 436. All or portions of the operating system, applications, modules, and/or data can also be cached in the RAM 412. The systems and methods described herein can be implemented utilizing various commercially available operating systems or combinations of operating systems.

A user can enter commands and information into the computer 402 through one or more wired/wireless input devices, e.g., a keyboard 438 and a pointing device, such as a mouse 440. Other input devices (not shown) can comprise a microphone, an infrared (IR) remote control, a joystick, a game pad, a stylus pen, touch screen or the like. These and other input devices are often connected to the processing unit 404 through an input device interface 442 that can be coupled to the system bus 408, but can be connected by other interfaces, such as a parallel port, an IEEE 1394 serial port, a game port, a universal serial bus (USB) port, an IR interface, etc.

A monitor 444 or other type of display device can be also connected to the system bus 408 via an interface, such as a video adapter 446. It will also be appreciated that in alternative embodiments, a monitor 444 can also be any display device (e.g., another computer having a display, a smart phone, a tablet computer, etc.) for receiving display information associated with computer 402 via any communication means, including via the Internet and cloud-based networks. In addition to the monitor 444, a computer typically comprises other peripheral output devices (not shown), such as speakers, printers, etc.

The computer 402 can operate in a networked environment using logical connections via wired and/or wireless communications to one or more remote computers, such as a remote computer(s) 448. The remote computer(s) 448 can be a workstation, a server computer, a router, a personal computer, portable computer, microprocessor-based entertainment appliance, a peer device or other common network node, and typically comprises many or all of the elements described relative to the computer 402, although, for purposes of brevity, only a remote memory/storage device 450 is illustrated. The logical connections depicted comprise wired/wireless connectivity to a local area network (LAN) 452 and/or larger networks, e.g., a wide area network (WAN) 454. Such LAN and WAN networking environments are commonplace in offices and companies, and facilitate enterprise-wide computer networks, such as intranets, all of which can connect to a global communications network, e.g., the Internet.

When used in a LAN networking environment, the computer 402 can be connected to the LAN 452 through a wired and/or wireless communication network interface or adapter 456. The adapter 456 can facilitate wired or wireless communication to the LAN 452, which can also comprise a wireless AP disposed thereon for communicating with the adapter 456.

When used in a WAN networking environment, the computer 402 can comprise a modem 458 or can be connected to a communications server on the WAN 454 or has other means for establishing communications over the WAN 454, such as by way of the Internet. The modem 458, which can be internal or external and a wired or wireless device, can be connected to the system bus 408 via the input device interface 442. In a networked environment, program modules depicted relative to the computer 402 or portions thereof, can be stored in the remote memory/storage device 450. It will be appreciated that the network connections shown are example and other means of establishing a communications link between the computers can be used.

The computer 402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, ag, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10BaseT wired Ethernet networks used in many offices.

Figure 5:
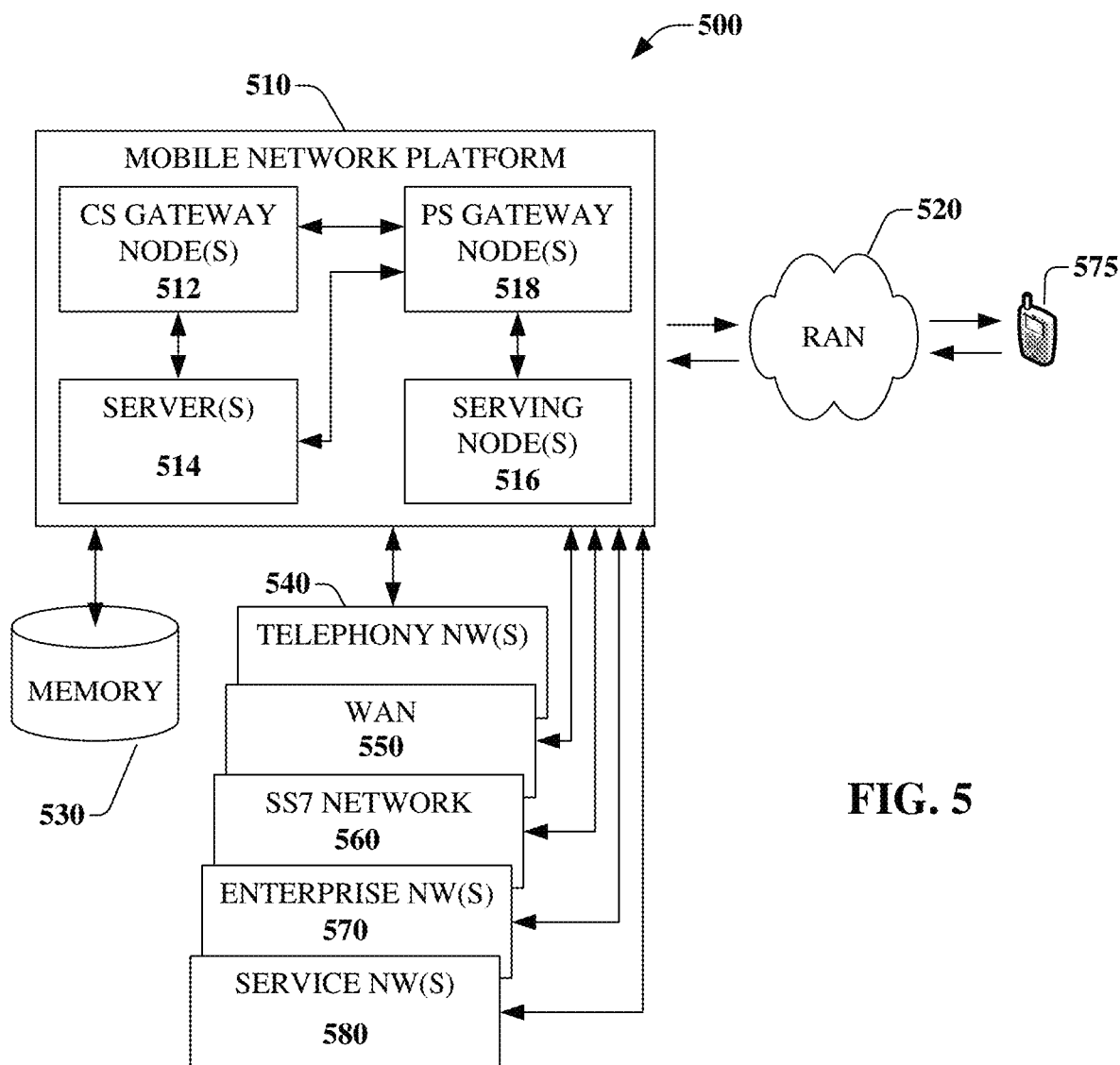
FIG. 5 is a block diagram of an example, non-limiting embodiment of a mobile network platform in accordance with various aspects described herein.

Turning now to FIG. 5, an embodiment 500 of a mobile network platform 510 is shown that is an example of network elements 150, 152, 154, 156, and/or VNEs 330, 332, 334, etc. For example, platform 510 can facilitate in whole or in part the database 180 being maintained that has information indicating states of network resources, which can be determined based on physical activities, logical activities and hybrid activities performed on or by the network resources; obtaining activity information for a particular network resource, where the activity information is a physical activity, a logical activity and/or a hybrid activity; and determining whether a state change for the particular network resource should be made such as to whether the activity information corresponds to and warrants change to at least one of an inventory state, an operational state, or a detailed state.

In one or more embodiments, the mobile network platform 510 can generate and receive signals transmitted and received by base stations or access points such as base station or access point 122. Generally, mobile network platform 510 can comprise components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, mobile network platform 510 can be included in telecommunications carrier networks and can be considered carrier-side components as discussed elsewhere herein. Mobile network platform 510 comprises CS gateway node(s) 512 which can interface CS traffic received from legacy networks like telephony network(s) 540 (e.g., public switched telephone network (PSTN), or public land mobile network (PLMN)) or a signaling system #7 (SS7) network 560. CS gateway node(s) 512 can authorize and authenticate traffic (e.g., voice) arising from such networks. Additionally, CS gateway node(s) 512 can access mobility, or roaming, data generated through SS7 network 560; for instance, mobility data stored in a visited location register (VLR), which can reside in memory 530. Moreover, CS gateway node(s) 512 interfaces CS-based traffic and signaling and PS gateway node(s) 518. As an example, in a 3GPP UMTS network, CS gateway node(s) 512 can be realized at least in part in gateway GPRS support node(s) (GGSN). It should be appreciated that functionality and specific operation of CS gateway node(s) 512, PS gateway node(s) 518, and serving node(s) 516, is provided and dictated by radio technology(ies) utilized by mobile network platform 510 for telecommunication over a radio access network 520 with other devices, such as a radiotelephone 575.

In addition to receiving and processing CS-switched traffic and signaling, PS gateway node(s) 518 can authorize and authenticate PS-based data sessions with served mobile devices. Data sessions can comprise traffic, or content(s), exchanged with networks external to the mobile network platform 510, like wide area network(s) (WANs) 550, enterprise network(s) 570, and service network(s) 580, which can be embodied in local area network(s) (LANs), can also be interfaced with mobile network platform 510 through PS gateway node(s) 518. It is to be noted that WANs 550 and enterprise network(s) 570 can embody, at least in part, a service network(s) like IP multimedia subsystem (IMS). Based on radio technology layer(s) available in technology resource(s) or radio access network 520, PS gateway node(s) 518 can generate packet data protocol contexts when a data session is established; other data structures that facilitate routing of packetized data also can be generated. To that end, in an aspect, PS gateway node(s) 518 can comprise a tunnel interface (e.g., tunnel termination gateway (TTG) in 3GPP UMTS network(s) (not shown)) which can facilitate packetized communication with disparate wireless network(s), such as Wi-Fi networks.

In embodiment 500, mobile network platform 510 also comprises serving node(s) 516 that, based upon available radio technology layer(s) within technology resource(s) in the radio access network 520, convey the various packetized flows of data streams received through PS gateway node(s) 518. It is to be noted that for technology resource(s) that rely primarily on CS communication, server node(s) can deliver traffic without reliance on PS gateway node(s) 518; for example, server node(s) can embody at least in part a mobile switching center. As an example, in a 3GPP UMTS network, serving node(s) 516 can be embodied in serving GPRS support node(s) (SGSN).

For radio technologies that exploit packetized communication, server(s) 514 in mobile network platform 510 can execute numerous applications that can generate multiple disparate packetized data streams or flows, and manage (e.g., schedule, queue, format . . . ) such flows. Such application(s) can comprise add-on features to standard services (for example, provisioning, billing, customer support . . . ) provided by mobile network platform 510. Data streams (e.g., content(s) that are part of a voice call or data session) can be conveyed to PS gateway node(s) 518 for authorization/authentication and initiation of a data session, and to serving node(s) 516 for communication thereafter. In addition to application server, server(s) 514 can comprise utility server(s), a utility server can comprise a provisioning server, an operations and maintenance server, a security server that can implement at least in part a certificate authority and firewalls as well as other security mechanisms, and the like. In an aspect, security server(s) secure communication served through mobile network platform 510 to ensure network's operation and data integrity in addition to authorization and authentication procedures that CS gateway node(s) 512 and PS gateway node(s) 518 can enact. Moreover, provisioning server(s) can provision services from external network(s) like networks operated by a disparate service provider; for instance, WAN 550 or Global Positioning System (GPS) network(s) (not shown). Provisioning server(s) can also provision coverage through networks associated to mobile network platform 510 (e.g., deployed and operated by the same service provider), such as the distributed antennas networks shown in FIG. 1(s) that enhance wireless service coverage by providing more network coverage.

It is to be noted that server(s) 514 can comprise one or more processors configured to confer at least in part the functionality of mobile network platform 510. To that end, the one or more processors can execute code instructions stored in memory 530, for example. It should be appreciated that server(s) 514 can comprise a content manager, which operates in substantially the same manner as described hereinbefore.

In example embodiment 500, memory 530 can store information related to operation of mobile network platform 510. Other operational information can comprise provisioning information of mobile devices served through mobile network platform 510, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 530 can also store information from at least one of telephony network(s) 540, WAN 550, SS7 network 560, or enterprise network(s) 570. In an aspect, memory 530 can be, for example, accessed as part of a data store component or as a remotely connected memory store.

In order to provide a context for the various aspects of the disclosed subject matter, FIG. 5, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that perform particular tasks and/or implement particular abstract data types.

Figure 6:
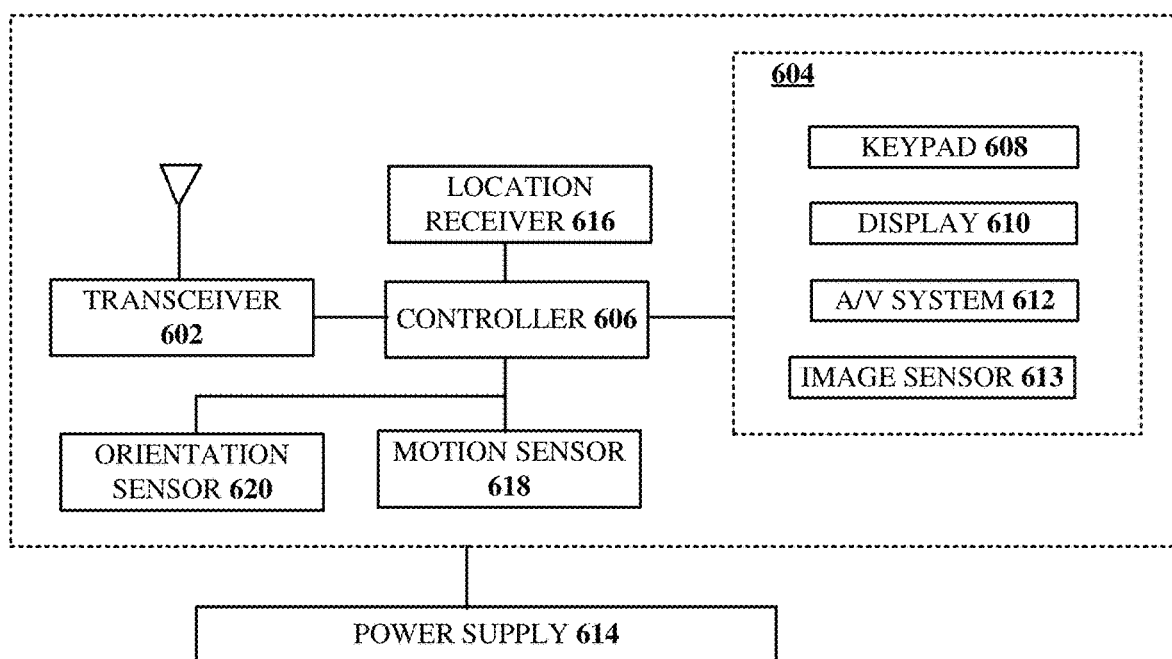
FIG. 6 is a block diagram of an example, non-limiting embodiment of a communication device in accordance with various aspects described herein.

Turning now to FIG. 6, an illustrative embodiment of a communication device 600 is shown. The communication device 600 can serve as an illustrative embodiment of devices such as data terminals 114, mobile devices 124, vehicle 126, display devices 144 or other client devices for communication via either communications network 125. For example, computing device 600 can facilitate in whole or in part the database 180 being maintained that has information indicating states of network resources, which can be determined based on physical activities, logical activities and hybrid activities performed on or by the network resources; obtaining activity information for a particular network resource, where the activity information is a physical activity, a logical activity and/or a hybrid activity; and determining whether a state change for the particular network resource should be made such as to whether the activity information corresponds to and warrants change to at least one of an inventory state, an operational state, or a detailed state.

The communication device 600 can comprise a wireline and/or wireless transceiver 602 (herein transceiver 602), a user interface (UI) 604, a power supply 614, a location receiver 616, a motion sensor 618, an orientation sensor 620, and a controller 606 for managing operations thereof. The transceiver 602 can support short-range or long-range wireless access technologies such as Bluetooth®, ZigBee®, Wi-Fi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1X, UMTS/HSDPA, GSM/GPRS, TDMA/EDGE, EV/DO, WiMAX, SDR, LTE, as well as other next generation wireless communication technologies as they arise. The transceiver 602 can also be adapted to support circuit-switched wireline access technologies (such as PSTN), packet-switched wireline access technologies (such as TCP/IP, VoIP, etc.), and combinations thereof.

The UI 604 can include a depressible or touch-sensitive keypad 608 with a navigation mechanism such as a roller ball, a joystick, a mouse, or a navigation disk for manipulating operations of the communication device 600. The keypad 608 can be an integral part of a housing assembly of the communication device 600 or an independent device operably coupled thereto by a tethered wireline interface (such as a USB cable) or a wireless interface supporting for example Bluetooth®. The keypad 608 can represent a numeric keypad commonly used by phones, and/or a QWERTY keypad with alphanumeric keys. The UI 604 can further include a display 610 such as monochrome or color LCD (Liquid Crystal Display), OLED (Organic Light Emitting Diode) or other suitable display technology for conveying images to an end user of the communication device 600. In an embodiment where the display 610 is touch-sensitive, a portion or all of the keypad 608 can be presented by way of the display 610 with navigation features.

The display 610 can use touch screen technology to also serve as a user interface for detecting user input. As a touch screen display, the communication device 600 can be adapted to present a user interface having graphical user interface (GUI) elements that can be selected by a user with a touch of a finger. The display 610 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 610 can be an integral part of the housing assembly of the communication device 600 or an independent device communicatively coupled thereto by a tethered wireline interface (such as a cable) or a wireless interface.

The UI 604 can also include an audio system 612 that utilizes audio technology for conveying low volume audio (such as audio heard in proximity of a human ear) and high-volume audio (such as speakerphone for hands free operation). The audio system 612 can further include a microphone for receiving audible signals of an end user. The audio system 612 can also be used for voice recognition applications. The UI 604 can further include an image sensor 613 such as a charged coupled device (CCD) camera for capturing still or moving images.

The power supply 614 can utilize common power management technologies such as replaceable and rechargeable batteries, supply regulation technologies, and/or charging system technologies for supplying energy to the components of the communication device 600 to facilitate long-range or short-range portable communications. Alternatively, or in combination, the charging system can utilize external power sources such as DC power supplied over a physical interface such as a USB port or other suitable tethering technologies.

The location receiver 616 can utilize location technology such as a global positioning system (GPS) receiver capable of assisted GPS for identifying a location of the communication device 600 based on signals generated by a constellation of GPS satellites, which can be used for facilitating location services such as navigation. The motion sensor 618 can utilize motion sensing technology such as an accelerometer, a gyroscope, or other suitable motion sensing technology to detect motion of the communication device 600 in three-dimensional space. The orientation sensor 620 can utilize orientation sensing technology such as a magnetometer to detect the orientation of the communication device 600 (north, south, west, and east, as well as combined orientations in degrees, minutes, or other suitable orientation metrics).

The communication device 600 can use the transceiver 602 to also determine a proximity to a cellular, Wi-Fi, Bluetooth®, or other wireless access points by sensing techniques such as utilizing a received signal strength indicator (RSSI) and/or signal time of arrival (TOA) or time of flight (TOF) measurements. The controller 606 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 600.

Other components not shown in FIG. 6 can be used in one or more embodiments of the subject disclosure. For instance, the communication device 600 can include a slot for adding or removing an identity module such as a Subscriber Identity Module (SIM) card or Universal Integrated Circuit Card (UICC). SIM or UICC cards can be used for identifying subscriber services, executing programs, storing subscriber data, and so on.

The terms "first," "second," "third," and so forth, as used in the claims, unless otherwise clear by context, is for clarity only and does not otherwise indicate or imply any order in time. For instance, "a first determination," "a second determination," and "a third determination," does not indicate or imply that the first determination is to be made before the second determination, or vice versa, etc.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory, by way of illustration, and not limitation, volatile memory, non-volatile memory, disk storage, and memory storage. Further, non-volatile memory can be included in read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, comprising single-processor or multiprocessor computer systems, mini-computing devices, mainframe computers, as well as personal computers, hand-held computing devices (e.g., PDA, phone, smartphone, watch, tablet computers, netbook computers, etc.), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

In one or more embodiments, information regarding use of services can be generated including services being accessed, media consumption history, user preferences, and so forth. This information can be obtained by various methods including user input, detecting types of communications (e.g., video content vs. audio content), analysis of content streams, sampling, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

Some of the embodiments described herein can also employ artificial intelligence (AI) to facilitate automating one or more features described herein. The embodiments (e.g., in connection with automatically identifying acquired cell sites that provide a maximum value/benefit after addition to an existing communication network) can employ various AI-based schemes for carrying out various embodiments thereof. Moreover, the classifier can be employed to determine a ranking or priority of each cell site of the acquired network. A classifier is a function that maps an input attribute vector, $x=(x_1, x_2, x_3, x_4 \ldots x_n)$, to a confidence that the input belongs to a class, that is, $f(x)$ =confidence(class). Such classification can employ a probabilistic and/or statistical-based analysis (e.g., factoring into the analysis utilities and costs) to determine or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to predetermined criteria which of the acquired cell sites will benefit a maximum number of subscribers and/or which of the acquired cell sites will add minimum value to the existing communication network coverage, etc.

As used in some contexts in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

As used herein, terms such as "data storage," data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to", "coupled to", and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

What is claimed is:

1. A device, comprising:
   a processing system including a processor; and
   a memory that stores executable instructions that, when executed by the processing system, facilitate performance of operations, the operations comprising:
   maintaining a database indicating states of network resources that are determined based on physical activities, logical activities and hybrid activities performed on or by the network resources;
   obtaining activity information for a particular network resource, wherein the activity information is one of a physical activity, a logical activity or a hybrid activity;
   determining whether the activity information corresponds to at least one of an inventory state, an operational state, or a detailed state;

responsive to the activity information corresponding to the inventory state, adjusting the inventory state to one of active, pending or decommissioned based on the activity information;

responsive to the activity information corresponding to the operational state, adjusting the operational state to one of operational or non-operational based on the activity information; and responsive to the activity information corresponding to the detailed state, adjusting, based on the activity information, the detailed state to indicate an ability for the particular network resource to process events, alerts or tickets.

2. The device of claim 1, wherein the network resources include sites, equipment, equipment holders, cards, ports, physical connections, connection end points, and logical connections, and wherein a total number of values that are identifiable by the detailed state are expandable.

3. The device of claim 1, wherein the activity information includes one of designing, hardware ordering, building, equipment verification testing, or system verification testing.

4. The device of claim 1, wherein the activity information includes one of base configuration, operating system installation, production configuration, or alarm verification.

5. The device of claim 1, wherein the particular network resource is a site, and wherein the activity information corresponding to the detailed state includes one of BUILD_IN_PROCESS, CANCELLED, CAPPED, INACTIVE_IN_CSS, RESERVED or PENDING_DECOMMISSION.

6. The device of claim 1, wherein the particular network resource is an equipment, and wherein the activity information corresponding to the detailed state includes one of BUILD_IN_PROCESS, CANCELLED, CAPPED, COLD_SPARE, INACTIVE_IN_CSS, INSTALLED, NVTPROV, PENDING_DECOMMISSION, PREPROV, PROV, RETIRED_IN_PLACE, ARCHIVED, HOT_SPARE, RESERVED, ORDERED, WARM_SPARE, or RETIRED.

7. The device of claim 1, wherein the particular network resource is an equipment holder, and wherein the activity information corresponding to the detailed state includes one of BUILD_IN_PROCESS, CANCELLED, INACTIVE_IN_CSS, INSTALLED, PENDING_DECOMMISSION, RETIRED_IN_PLACE, ARCHIVED, RESERVED, ORDERED, or RETIRED.

8. The device of claim 1, wherein the particular network resource is a card, and wherein the activity information corresponding to the detailed state includes one of BUILD_IN_PROCESS, CANCELLED, CAPPED, COLD_SPARE, INSTALLED, NVTPROV, PENDING_DECOMMISSION, PREPROV, PROV, RETIRED_IN_PLACE, ARCHIVED, RESERVED, ORDERED, or RETIRED.

9. The device of claim 1, wherein the particular network resource is a port, and wherein the activity information corresponding to the detailed state includes one of CANCELLED, INSTALLED, NVTPROV, PENDING_DECOMMISSION, PREPROV, PROV, RETIRED_IN_PLACE, ARCHIVED, DEFECTIVE, FAILED, RESERVED, SUSPECT, UNEQUIPPED, NOT_WIRED, WIRED_UNEQUIPPED, or ORDERED.

10. The device of claim 1, wherein the particular network resource is a physical connection, and wherein the activity information corresponding to the detailed state includes one of CANCELLED, INSTALLED, PENDING_DECOMMISSION, RETIRED_IN_PLACE, ARCHIVED, RESERVED, ORDERED, or RETIRED.

11. The device of claim 1, wherein the particular network resource is a connection endpoint, and wherein the activity information corresponding to the detailed state includes one of CANCELLED, NVTPROV, PENDING_DECOMMISSION, PREPROV, PROV, ARCHIVED, TESTING, or RESERVED.

12. The device of claim 1, wherein the particular network resource is a logical connection, and wherein the activity information corresponding to the detailed state includes one of DOWNSPEED, UPSPEED, ASR_SUBMITTED, CANCELLED, DISCO_ASR_ISSUED, DISCO_FOC_RECEIVED, FAILED_ACTIVATION, DLR_RECEIVED, FOC_RECEIVED, PENDING_DECOMMISSION, ARCHIVED, TESTING, RESERVED, DESIGN, ADD, or CHANGE.

13. The device of claim 1, wherein the obtaining the activity information for the particular network resource comprises receiving a user input indicating completion of the physical activity, the logical activity or the hybrid activity.

14. The device of claim 1, wherein the obtaining the activity information for the particular network resource comprises receiving, over a network from the particular network resource, an activity completion message indicating completion of the physical activity, the logical activity or the hybrid activity.

15. A method, comprising:

receiving, over a network by a processing system including a processor, a notification indicating an event associated with a network resource;

responsive to the notification, accessing, over the network by the processing system, a database to identify state information corresponding to the network resource, wherein the database stores states of network resources that are determined based on physical activities, logical activities and hybrid activities performed on or by the network resources;

determining, by the processing system according to the state information, an inventory state, an operational state, and a detailed state for the network resource resulting in a multi-state determination;

generating, by the processing system, a service ticket according to an analysis of the event and the multi-state determination;

obtaining activity information for a particular network resource, wherein the activity information is one of a physical activity, a logical activity or a hybrid activity;

determining whether the activity information corresponds to at least one of the inventory state, the operational state, or the detailed state;

responsive to the activity information corresponding to the inventory state, adjusting the inventory state to one of active, pending or decommissioned based on the activity information;

responsive to the activity information corresponding to the operational state, adjusting the operational state to one of operational or non-operational based on the activity information; and responsive to the activity information corresponding to the detailed state, adjusting, based on the activity information, the detailed state to indicate an ability for the particular network resource to process events, alerts or tickets.

16. The method of claim 15, comprising:

providing, over the network by the processing system, the service ticket to equipment of a technician, wherein the inventory state is active, wherein the operational state is operational, and wherein the event is an alarm.

17. The method of claim 15, comprising:

receiving, over the network by the processing system, a second notification indicating a second event associated with a second network resource;

responsive to the second notification, accessing, over the network by the processing system, the database to identify second state information corresponding to the second network resource;

determining, by the processing system according to the second state information, a second inventory state, a second operational state, and a second detailed state for the second network resource resulting in a second multi-state determination; and determining, by the processing system, to delay generating or to not generate a second service ticket according to a second analysis of the second event and the second multi-state determination, wherein the operational state is non-operational.

18. A non-transitory machine-readable medium, comprising executable instructions that, when executed by a processing system including a processor, facilitate performance of operations, the operations comprising:

maintaining a database that identifies states of network resources, wherein the states of the network resources are determined based on physical activities, logical activities and hybrid activities performed on or by the network resources;

receiving, from a network server, a state request for a particular network resource;

providing, to the network server, state information for the particular network resource comprising an inventory state, an operational state, and a detailed state, wherein the providing the state information causes the network server to delay generating or to not generate a service ticket;

obtaining activity information for a second network resource, wherein the activity information is one of a physical activity, a logical activity or a hybrid activity;

determining whether the activity information corresponds to at least one of the inventory state, the operational state, or the detailed state;

responsive to the activity information corresponding to the inventory state, adjusting the inventory state to one of active, pending or decommissioned based on the activity information;

responsive to the activity information corresponding to the operational state, adjusting the operational state to one of operational or non-operational based on the activity information; and responsive to the activity information corresponding to the detailed state, adjusting, based on the activity information, the detailed state to indicate an ability for the particular network resource to process events, alerts or tickets.

19. The non-transitory machine-readable medium of claim 18, wherein the obtaining the activity information for the second network resource comprises receiving, over a network from the second network resource, an activity completion message indicating completion of the physical activity, the logical activity or the hybrid activity.

* * * * *